US 11,488,032 B2

(12) United States Patent
Singhal et al.

(10) Patent No.: US 11,488,032 B2
(45) Date of Patent: Nov. 1, 2022

(54) SYSTEMS AND METHODS FOR REAL TIME CONFIGURABLE RECOMMENDATION USING USER DATA

(71) Applicant: Tata Consultancy Services Limited, Mumbai (IN)

(72) Inventors: Rekha Singhal, Thane (IN); Gautam Shroff, Gurgaon (IN); Vartika Tewari, Gurgaon (IN); Sanket Kadarkar, Thane (IN); Siddharth Verma, Gurgaon (IN); Sharod Roy Choudhury, Thane (IN); Lovekesh Vig, Gurgaon (IN); Rupinder Virk, Thane (IN)

(73) Assignee: Tata Consultancy Limited Services, Mumbai (IN)

( * ) Notice: Subject to any disclaimer, the term of this patent is extended or adjusted under 35 U.S.C. 154(b) by 894 days.

(21) Appl. No.: 16/361,778

(22) Filed: Mar. 22, 2019

(65) Prior Publication Data

US 2020/0090056 A1  Mar. 19, 2020

(30) Foreign Application Priority Data

Sep. 19, 2018  (IN) .............................. 201821035355

(51) Int. Cl.
*G06N 5/04* (2006.01)
*G06F 16/901* (2019.01)
(Continued)

(52) U.S. Cl.
CPC ............. *G06N 5/04* (2013.01); *G06F 16/902* (2019.01); *G06F 16/908* (2019.01);
(Continued)

(58) Field of Classification Search
CPC .......... G06N 5/04; G06N 3/049; G06N 20/20; G06N 3/08; G06N 5/02; G06N 3/0445;
(Continued)

(56) References Cited

U.S. PATENT DOCUMENTS

2010/0049538 A1  2/2010  Frazer et al.
2014/0280193 A1*  9/2014  Cronin ................... G06N 20/00
                                                        707/741
(Continued)

OTHER PUBLICATIONS

Guidotti, R. et al. (2018) "Discovering temporal regularities in retail customers' shopping behavior," *EPJ Data Science*; pp. 1-26.

*Primary Examiner* — Juan A Torres
(74) *Attorney, Agent, or Firm* — Finnegan, Henderson, Farabow, Garrett & Dunner, L.L.P.

(57) ABSTRACT

Business to Consumer (B2C) systems face a challenge of engaging users since offers are created using static rules generated using clustering on large transactional data generated over a period of time. Moreover, the offer creation and assignment engine is disjoint to the transactional system which led to significant gap between history used to create offers and current activity of users. Systems and methods of the present disclosure provide a meta-model based configurable auto-tunable recommendation model generated by ensembling optimized machine learning and deep learning models to predict a user's likelihood to take an offer and deployed in real time. Furthermore, the offer given to the user is based on a current context derived from the user's recent behavior that makes the offer relevant and increases probability of conversion of the offer to a sale. The system achieves low recommendation latency and scalable high throughput by virtue of the architecture used.

20 Claims, 22 Drawing Sheets

(51) Int. Cl.
  *G06N 20/20* (2019.01)
  *G06F 16/908* (2019.01)
  *G06K 9/62* (2022.01)
  *G06N 3/04* (2006.01)

(52) U.S. Cl.
  CPC .......... *G06K 9/6256* (2013.01); *G06N 3/049* (2013.01); *G06N 20/20* (2019.01)

(58) Field of Classification Search
  CPC ... G06N 3/0454; G06F 16/902; G06F 16/908; G06K 9/6256
  USPC .......................................................... 706/12
  See application file for complete search history.

(56) References Cited

U.S. PATENT DOCUMENTS

| | | | |
|---|---|---|---|
| 2018/0232661 A1* | 8/2018 | Li | G06K 9/6261 |
| 2019/0295114 A1* | 9/2019 | Pavletic | G06K 9/6256 |
| 2020/0012941 A1* | 1/2020 | Ukil | G06N 5/003 |

* cited by examiner

Single Common Data Format (CDF) Created by Fusion of Raw Datasets and BDS

400

Common Data Format

| User ID | Product ID | Time | Quantity | Category ID | Brand | Age | Region | Type | ... |
|---------|------------|------|----------|-------------|-------|-----|--------|------|-----|
| 1 | 11 | t1 | 3 | c1 | b1 | 25 | r0 | order | many more |
| 2 | 12 | t2 | 6 | c2 | b2 | 40 | r1 | order | |
| 3 | 13 | t3 | 1 | c3 | b3 | 32 | r2 | order | |
| 4 | 14 | t4 | 2 | c4 | b4 | 28 | r3 | order | |
| 1 | 14 | t8 | - | c1 | b1 | 25 | r0 | view | |
| 2 | 11 | t9 | - | c2 | b2 | 40 | r1 | view | |

; many
; more

FIG.4B

SYSTEMS AND METHODS FOR REAL TIME CONFIGURABLE RECOMMENDATION USING USER DATA

PRIORITY CLAIM

This U.S. patent application claims priority under 35 U.S.C. § 119 to: Indian Patent Application No. 201821035355, filed on 19 September, 2018. The entire contents of the aforementioned application are incorporated herein by reference.

TECHNICAL FIELD

The disclosure herein generally relates to systems and methods for providing recommendations in an online setting, and, more particularly, to systems and methods that facilitate configurable recommendations for a variety of Business to Consumer (B2C) scenarios and have a scalable, low-latency architecture providing a right recommendation to a right user at a right time.

BACKGROUND

Digitization wave and wide availability of data analytic platforms have increased the challenge of engaging customers for most Business to Consumer (B2C) systems such as Retail, Banking, Insurance, Telecom and Utilities. The traditional approach of customer engagement is to create offers and send them via email or other offline channels hoping the customer will come back to take the offer. Most of the times, these offers are created using static rules created by business owners or generated using clustering on large transactional data generated over a period of time. Moreover, the offer creation and assignment engine is disjoint to the transactional system which leads to significant gap between history used to create offers and current activity of users. Digitization of services has increased the dynamism and requires intelligent mechanism of assigning offers to customers which are relevant at that point of time and are likely to convert into sale transaction while increasing business owners' revenue.

SUMMARY

Embodiments of the present disclosure present technological improvements as solutions to one or more of the above-mentioned technical problems recognized by the inventors in conventional systems.

In an aspect, there is provided a processor implemented method for performing a model driven domain specific search comprising: receiving via a batch interface, raw user data associated with a plurality of users from a plurality of sources; merging, by the one or more hardware processors, the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table; and generating, by the one or more hardware processors, a configurable recommendation model by: processing the CDF to generate a set of features for building one or more machine learning models and one or more deep learning models, wherein the features comprise temporal features and non-temporal features; creating a feature dictionary for the one or more machine learning models, wherein the feature dictionary is an in-memory persistent store configured to store the set of features and values associated thereof; and ensembling the one or more machine learning models and the one or more deep learning models built using the generated set of features, to generate the configurable recommendation model.

In another aspect, there is provided a system comprising: one or more data storage devices operatively coupled to the one or more processors and configured to store instructions configured for execution by the one or more processors to: receive, via a batch interface, raw user data associated with a plurality of users from a plurality of sources; merge the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table; and generate a configurable recommendation model by: processing the CDF to generate a set of features for building one or more machine learning models and one or more deep learning models, wherein the features comprise temporal features and non-temporal features; creating a feature dictionary for the one or more machine learning models, wherein the feature dictionary is an in-memory persistent store configured to store the set of features and values associated thereof; and ensembling the one or more machine learning models and the one or more deep learning models built using the generated set of features, to generate the configurable recommendation model.

In yet another aspect, there is provided a computer program product comprising a non-transitory computer readable medium having a computer readable program embodied therein, wherein the computer readable program, when executed on a computing device, causes the computing device to: receive, via a batch interface, raw user data associated with a plurality of users from a plurality of sources; merge the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table; and generate a configurable recommendation model by: processing the CDF to generate a set of features for building one or more machine learning models and one or more deep learning models, wherein the features comprise temporal features and non-temporal features; creating a feature dictionary for the one or more machine learning models, wherein the feature dictionary is an in-memory persistent store configured to store the set of features and values associated thereof; and ensembling the one or more machine learning models and the one or more deep learning models built using the generated set of features, to generate the configurable recommendation model.

In an embodiment of the present disclosure, one of the one or more machine learning models is Extreme Gradient Boosting (XGBoost) and one of the one or more deep learning models is Long Short Term Memory (LSTM).

In an embodiment of the present disclosure, the one or more hardware processors are further configured to process the CDFs based on (i) a metafile1 structure that defines one or more functions to be executed on each of the columns of the CDF and generates a set of first level features for building the one or more deep learning models; and (ii) a metafile2 structure that defines one or more functions to be executed on each column of the feature dictionary for creating a second level of features in the form of one hot vectors used for building the one or more machine learning models.

In an embodiment of the present disclosure, the set of features are categorized as user level features, product level features and user-product level features and the temporal features and the non-temporal features are identified for each of the categorized levels In an embodiment of the present disclosure, an inference based on the raw user data derived at time 't' by the LSTM model is performed using a current hidden state $h_t$ and a current memory state $c_t$ of each cell constituting the LSTM model, wherein the current hidden state $h_t$ and the current memory state $c_t$ are trained with historical data until 't−1' and stored in the feature dictionary for each user and fetched when generating an inference in response to a real time user action thereby reducing latency in inference time.

In an embodiment of the present disclosure, the one or more hardware processors are further configured to generate the recommendation in response to the real time user action using the generated configurable recommendation model by: receiving via a real time interface, the real time user action that needs to trigger the recommendation for a user; retrieving a current context associated with the real time user action; fetching real time features associated with the current context and corresponding to the one or more machine learning models and the one or more deep learning models; generating the one hot vectors as the in-memory store, for the one or more machine learning models and an input vector for the one or more deep learning models based on the fetched real time features; deriving an inference by each of the one or more machine learning models and the one or more deep learning models based on the generated one hot vectors and the input vector; ensembling the inference derived by each of the one or more machine learning models and the one or more deep learning models; and generating the recommendation using the ensembled inference based on the current context specific business goals and business optimization constraints.

In an embodiment of the present disclosure, the one or more hardware processors are further configured to dynamically update the feature dictionary with the current context associated with each of the real time features.

In an embodiment of the present disclosure, memory for the feature dictionary is allocated dynamically based on need and is indexed on an identifier associated with each user for faster access.

In an embodiment of the present disclosure, the one or more hardware processors are further configured to: monitor performance indicators including (i) accuracy of the configurable recommendation model based on the set of real time features and values thereof, for building the one or more machine learning models and the one or more deep learning models (ii) business objective performance based on the set of real time features and values thereof, the business goals, business optimization constraints and actual conversion of the generated recommendation corresponding to each real time user action and (iii) performance of a business to consumer (B2C) system using the configurable recommendation model based on throughput and recommendation latency; and initiate self-tuning by performing one or more of (i) regenerating the configurable recommendation model based on either regenerating or updating the set of features, (ii) updating the business optimization constraints and (iii) scaling out one or more nodes to improve throughput of the B2C system if the monitored performance indicators deviate from a pre-defined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A through FIG. 4E illustrate a high level flow chart indicating the application of the real configurable recommendation model of FIG. 2 for feature engineering, modelling and ensemble learning in accordance with an embodiment of the present disclosure.

DETAILED DESCRIPTION OF EMBODIMENTS

Figure 1:
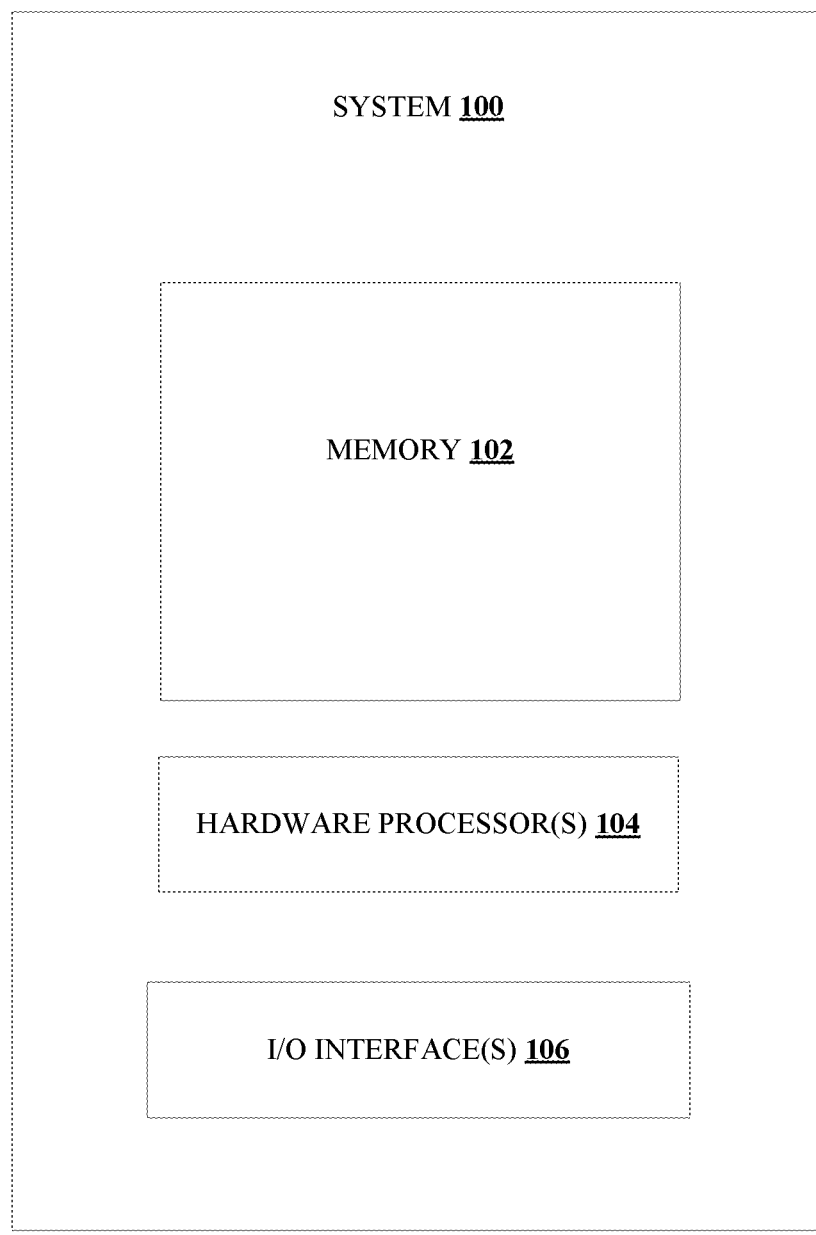
FIG. 1 illustrates an exemplary block diagram of a system for real time configurable recommendation using user data, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Data analytics has evolved from descriptive, diagnostic and predictive to prescriptive analytics for effective business operations. Prescriptive analytics refers to 'what shall I do' to engage customers in Business to Consumer (B2C) systems using recommendations and/or campaigns. Systems and methods of the present disclosure facilitate recommendations keeping business objectives in focus, thereby enabling a 'right' offer given to a customer at a 'right' time in an online setting while achieving the business objectives. An analytical (prediction) model is employed to predict a customer's repeat probability using at least one of machine or deep learning techniques on transaction or action data, social feeds and data from other business channels that together represent 'raw user data' referred hereinafter in the description. Accordingly, raw user data may include both structured and unstructured data.

Systems of the present disclosure customize the analytic model for any B2C system such as Retail, Telecom, Hospitality, Banking and Insurance thereby providing a configurable system to support a variety of B2C scenarios. Meta-models are employed which define functions for creating business specific features on raw user data from business users. Further, to co-locate with B2C systems which process millions of transactions per second requiring low latency, the systems of the present disclosure support high throughput and very low latency for making recommendations with high accuracy.

Referring now to the drawings, and more particularly to FIG. 1 through FIG. 15 where similar reference characters denote corresponding features consistently throughout the figures, there are shown preferred embodiments and these embodiments are described in the context of the following exemplary system and/or method.

FIG. 1 illustrates an exemplary block diagram of a system 100 for real time configurable recommendation using user data, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In accordance with the present disclosure, the system of FIG. 1 solves an optimization problem for business objectives using an analytical model for predicting customer repeat probability and propensity to an offer before assigning the offer to the customer. In the context of the present disclosure, the expressions 'offer' and 'recommendation' may be used interchangeably hereinafter. Formally, the optimization problem may be defined as follows:

Given: Raw user data for C customers, business goal G targeting customers and business budget B for time period D Minimize $G-G_a$ while assigning $N_f$ offers $F_1, F_2, \ldots, F_{N_f}$ to a set of $C_f$ customers $C_1, C_2, \ldots, C_{C_f}$ at time $T \leq D$, where $G_a$ is a business goal achieved at time T, $(C_1, C_2, \ldots, C_{C_f}) \cup C$, Offer $F_i$ assigned to customer $C_k$ is of value $V_i$ and cost $C_{t_i}$.

Constraints $\Sigma_{i=0}^{i=N_f} C_{t_i} < B$ at time T wherein $G_a$ is a function of customers' repeating an action or transaction, which can be captured using the configurable recommendation model. In accordance with the present disclosure, the configurable recommendation model is built such that it can be configured for a variety of B2C domains.

Figure 2:
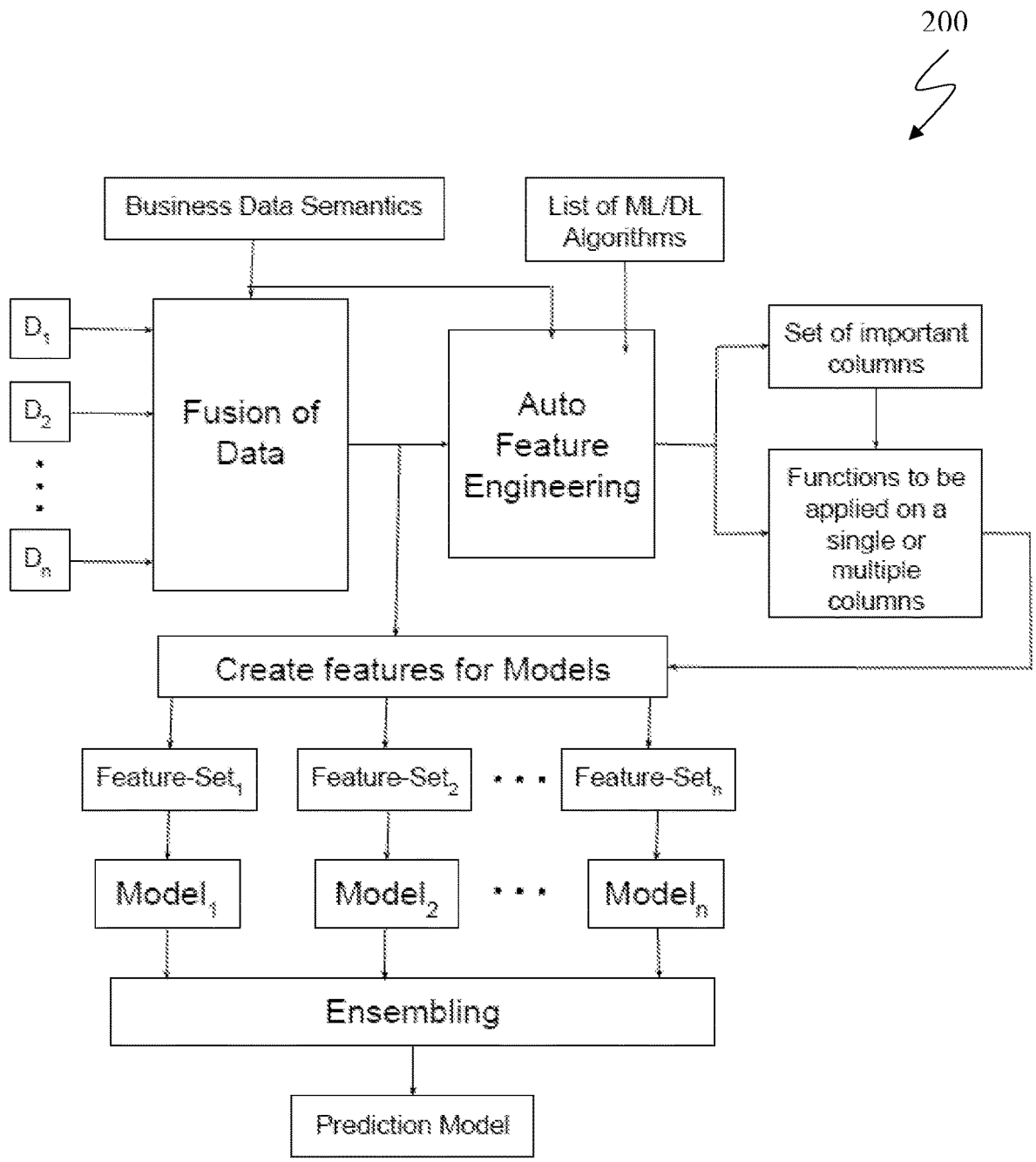
FIG. 2 illustrates a high level architecture of a part of the system of FIG. 1 that generates a configurable recommendation model in accordance with an embodiment of the present disclosure.

FIG. 2 illustrates a high level architecture 200 of a part of the system of FIG. 1 that generates a configurable recommendation model in accordance with an embodiment of the present disclosure. A business domain may source diverse data to build the configurable recommendation model. As shown, 'data fusion' is performed to clean and unify the diverse data which may be fed to an 'auto feature engineering' module along with a list of machine learning and/or deep learning models to be used. The output of the auto feature engineering module is a set of features for each given model or a set of column(s) with their respective functions to build features. The features are then used to build corresponding models which are ensembled to generate the configurable recommendation model.

Raw user data comprises information about business entities and transactions or actions on the entities. The probability of a customer repeating its action depends on its persona as well as its temporal behavior. In accordance with the present disclosure, the behavior of the entities (e.g. customer) is captured from the raw user data by processing it to build temporal and non-temporal features. Temporal behavior may be a function of time such as time of day or month or environment such as its location while non-temporal features capture the behavior of an entity independent of any time window e.g. customer persona. In accordance with the present disclosure, the configurable recommendation model is built using both temporal and non-temporal features of customers (or entities in the business domain). Furthermore, both machine learning and deep learning models are employed to capture temporal behavior of customers in the prediction model. In the context of the present disclosure, the expressions 'user' and 'customer' may be used interchangeably. Likewise, the expressions 'configurable recommendation model', 'prediction model', 'analytical model', 'customer repeat probability model' also may be used interchangeably.

The accuracy of the configurable recommendation model depends on the richness and righteousness of the set of features pertaining to a prediction target. In accordance with the present disclosure, the set of features are categorized into a generic set of levels and feature engineering may be performed at these levels to incorporate all aspects of customer behaviour in order to predict its repeat probability. In an embodiment, the set of features may be categorized as user level features, product level features and user-product level features.

User level features: They define user behavior such as users' product purchasing frequency, users' reorder frequency, geography, network, age of user, and the like. They help in detecting the type of user and learning user level similarity.

Product level features: Meta information provided on products help in understanding product level similarity. In accordance with the present disclosure, features like number of times product is purchased, cost, brand, department of product, and the like are generated.

User-product level features: To capture product affinity for each user and to understand their preferences, user-product based features may be generated. These capture information such as number of times a product is purchased by a user, number of distinct products ordered by a user, and the like.

In accordance with the present disclosure, for each of the feature levels, both temporal and non-temporal features are identified to build the configurable recommendation model.

Non-temporal features: They capture persona of entities and are built using statistical functions such as counts, sums, and aggregate on transaction history. They help in capturing the characteristics and interactions among users, merchants, brands, categories and products.

Count/Ratio: These are generated by counting basic statistical information of each presented product, from the users overall orders, views and impression transaction logs such as total view counts, total distinct products count, ratio of new products in every order, etc.

Aggregation: 'Product aggregation' features include value of distinct products/items clicked and viewed in a period of time. Example of 'User aggregation' feature is number of times a user purchases products of a particular brand. Also, daily, weekly and monthly aggregation is used to get information on the most favorable days for buying a product.

Temporal features: Different users behave differently when buying various products, these are based on click patterns, type of products and also the time of the day and day of the week. The sequence in which the user ordered the products and their importance are also captured by adding temporal sequential features like:

Recent: Users' recent purchasing patterns are more relevant when it comes to identifying grocery orders. Features such as, when a user is out of milk, eggs, etc. helps in identifying their next orders. Additional importance is given to recent orders by using different time windows of days for finding features like number of products viewed, clicked, ordered in last 3 days, 7 days etc.

Date-time: Users' purchasing patterns at different times of the day and days of week are also important when identifying the next order of a user. Every user has preference in terms of different date-time aspects. Features such as 'calculating number of purchases', 'add to cart orders', changing trends on different days of week' and 'hour of day' help in learning such information.

Sequential: The sequence in which the products are bought by a user help in identifying patterns like replacement products, trend of product purchases etc. Features like difference in days of the order containing the product from last order, presence of product in each order of a user for every user are extracted and Recurrent Neural Network (RNN) such as Long Short Term Memory (LSTM) may be used to learn from these.

In accordance with the present disclosure, domain specific data sets or raw user data are abstracted using the meta-model to build temporal and non-temporal features. A domain data scientist may specify various levels of features as discussed above. However, once specified, the system 100 automatically generates exhaustive temporal and non-temporal features for all feature levels.

Figure 3:
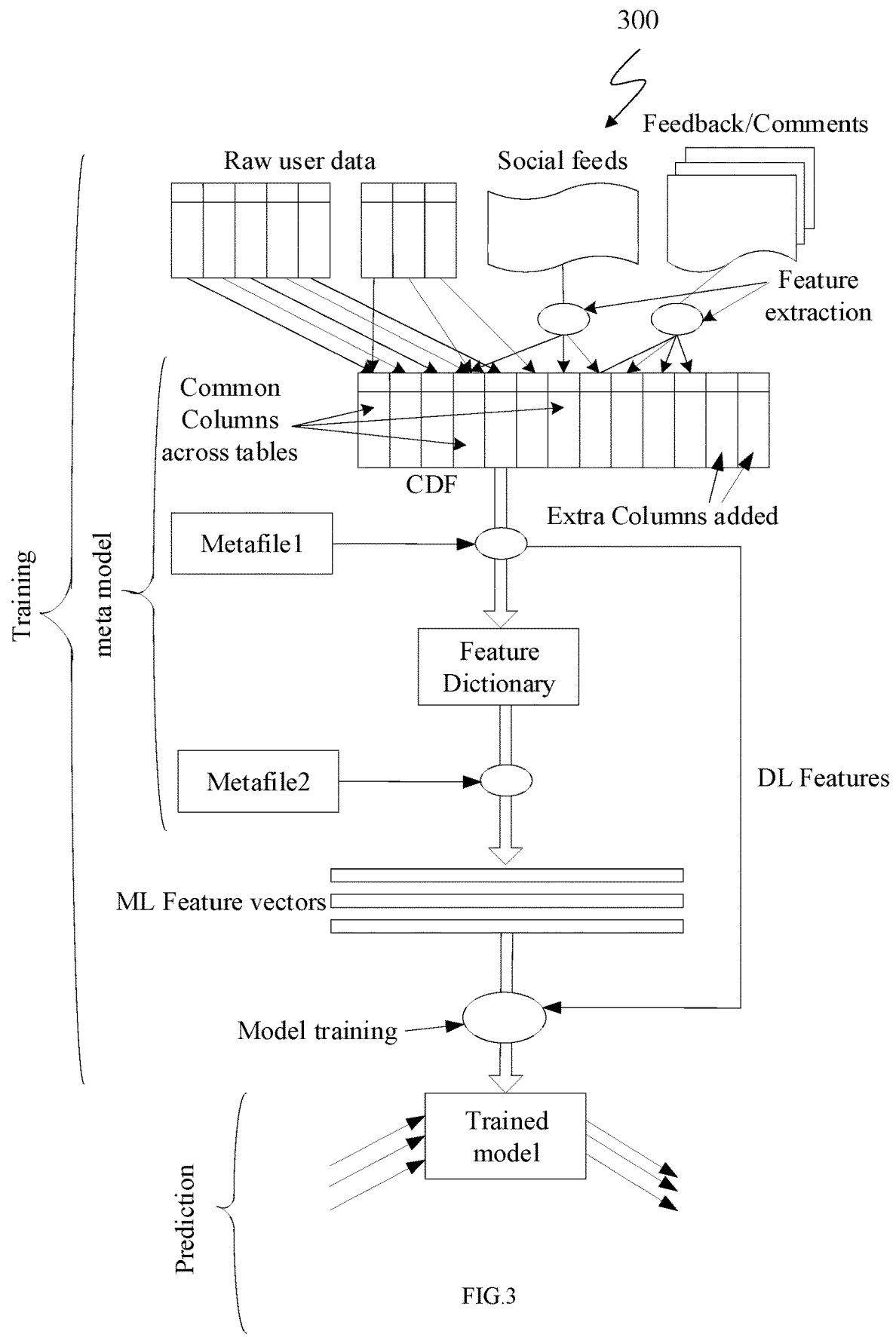
FIG. 3 illustrates a high level flow chart indicating the method for generating the configurable recommendation model of FIG. 2 in accordance with an embodiment of the present disclosure.
Figure 4A:
Figure 4C:
Figure 4D:
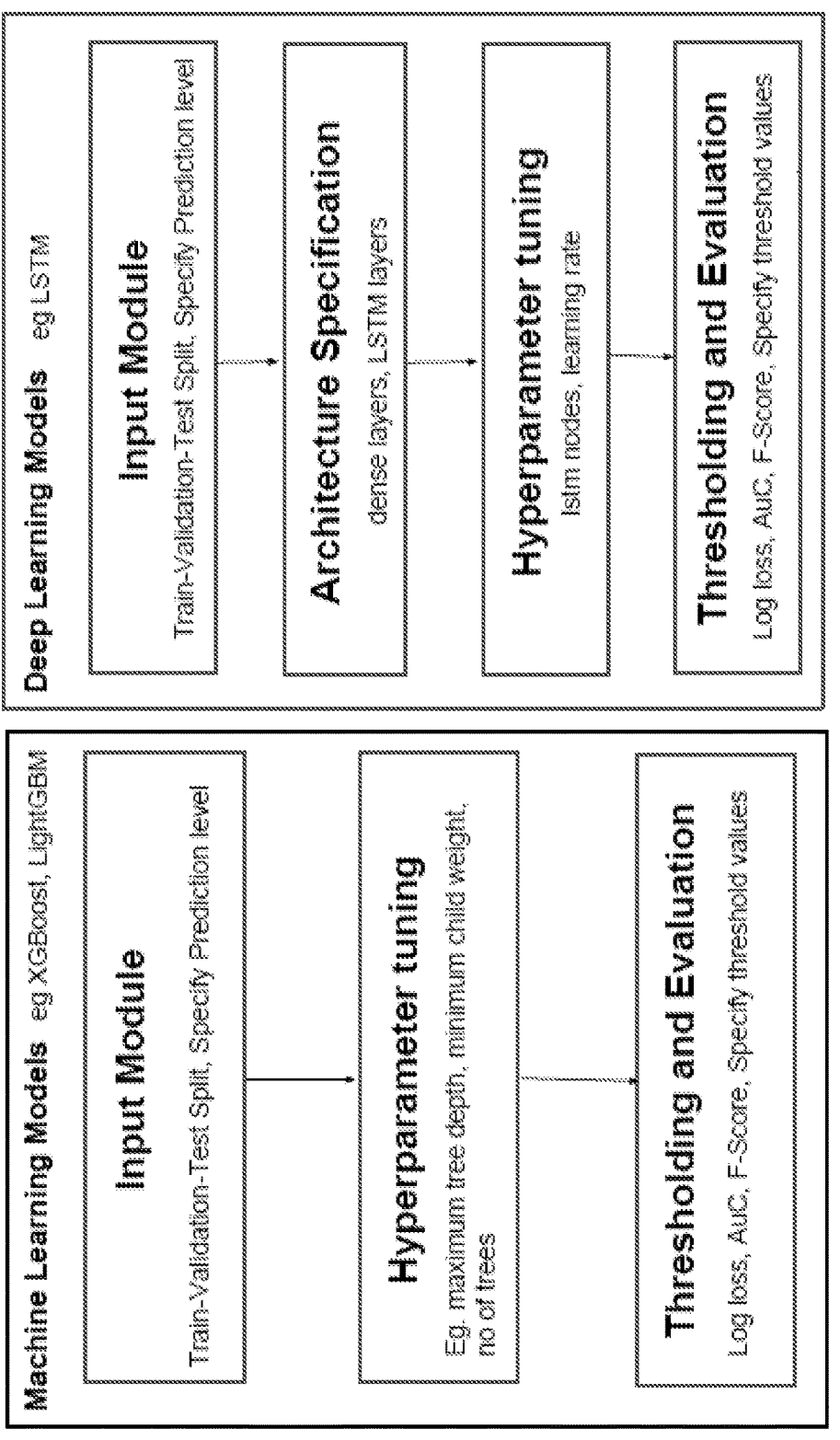
Figure 4E:

FIG. 3 illustrates a high level flow chart 300 indicating the method for generating the configurable recommendation model of FIG. 2 in accordance with an embodiment of the present disclosure. As seen in the high level architecture 200 of FIG. 2, diverse data from multiple sources is unified. FIG. 3 illustrates the diverse data is unified into a common data format (CDF). In an embodiment of the present disclosure, as illustrated, the meta-model consists of the raw user data defined in CDF and two meta files defining the properties of columns in the CDF and their role in building features for the machine learning and deep learning models that may be employed. In an embodiment, a metafile1 processes the CDF and creates features for the deep learning models and a feature dictionary for the machine learning (ML) models. The feature dictionary stores basic features with their values (like an XML structure) for the ML models. A metafile2 processes the basic features in the feature dictionary to create complex features for the ML models. In an embodiment, the feature creation process is defined using functions which take one or more columns of the CDF as inputs. These functions are provided as a library to be used by the data scientist while defining the meta-model. It is imperative that performance of the ML models is sensitive to its hyper parameters and its tuning depends on the domain specific data set or the raw user data. It is assumed that the hyper parameters are tuned once the data set is loaded in to the system 100. Similarly, performance of the deep learning models depend on its architecture and initial weights, which can be decided only once upon availability of the domain specific data set. FIG. 4A through FIG. 4E illustrate a high level flow diagram 400 indicating the application of the real configurable recommendation model of FIG. 2 for feature engineering, modelling and ensemble learning in accordance with an embodiment of the present disclosure, wherein the raw user data including raw datasets and business data semantics (FIG. 4A) from multiple sources are unified into the CDF (FIG. 4B) which is processed to generate the set of features (FIG. 4C) for building machine learning models and deep learning models (FIG. 4D). The machine learning models and the deep learning models are then ensembled (FIG. 4E) to generate the configurable recommendation model.

Figure 5:
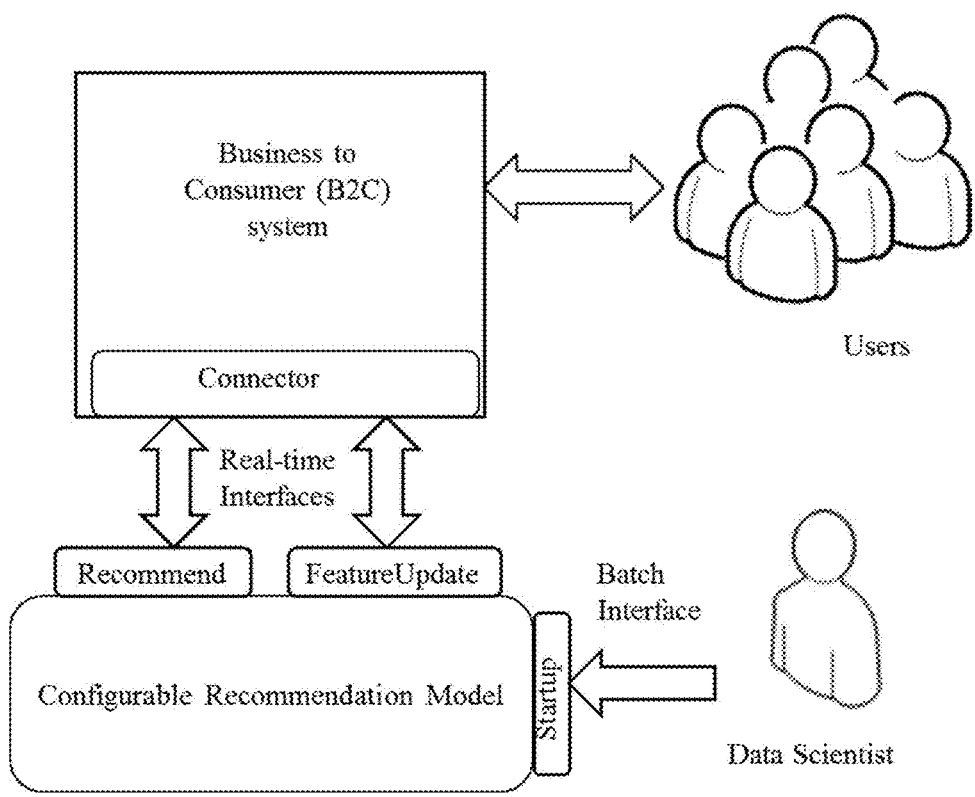
FIG. 5 illustrates interfaces of the system of FIG. 1 in accordance with an embodiment of the present disclosure.
Figure 6A:
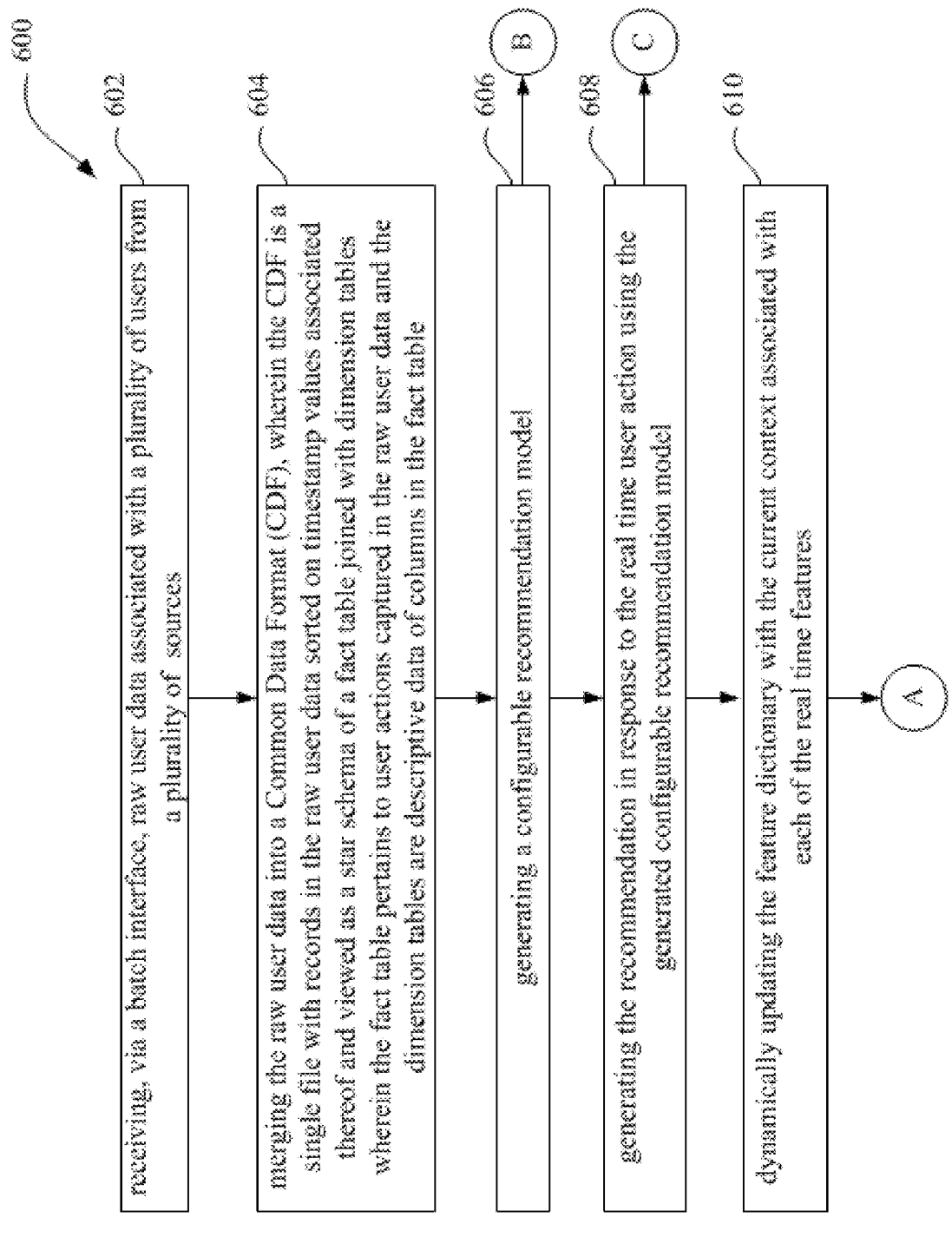
FIG. 6A through FIG. 6D illustrate an exemplary flow diagram for a computer implemented method for real time configurable recommendation using user data, in accordance with an embodiment of the present disclosure.
Figure 6B:
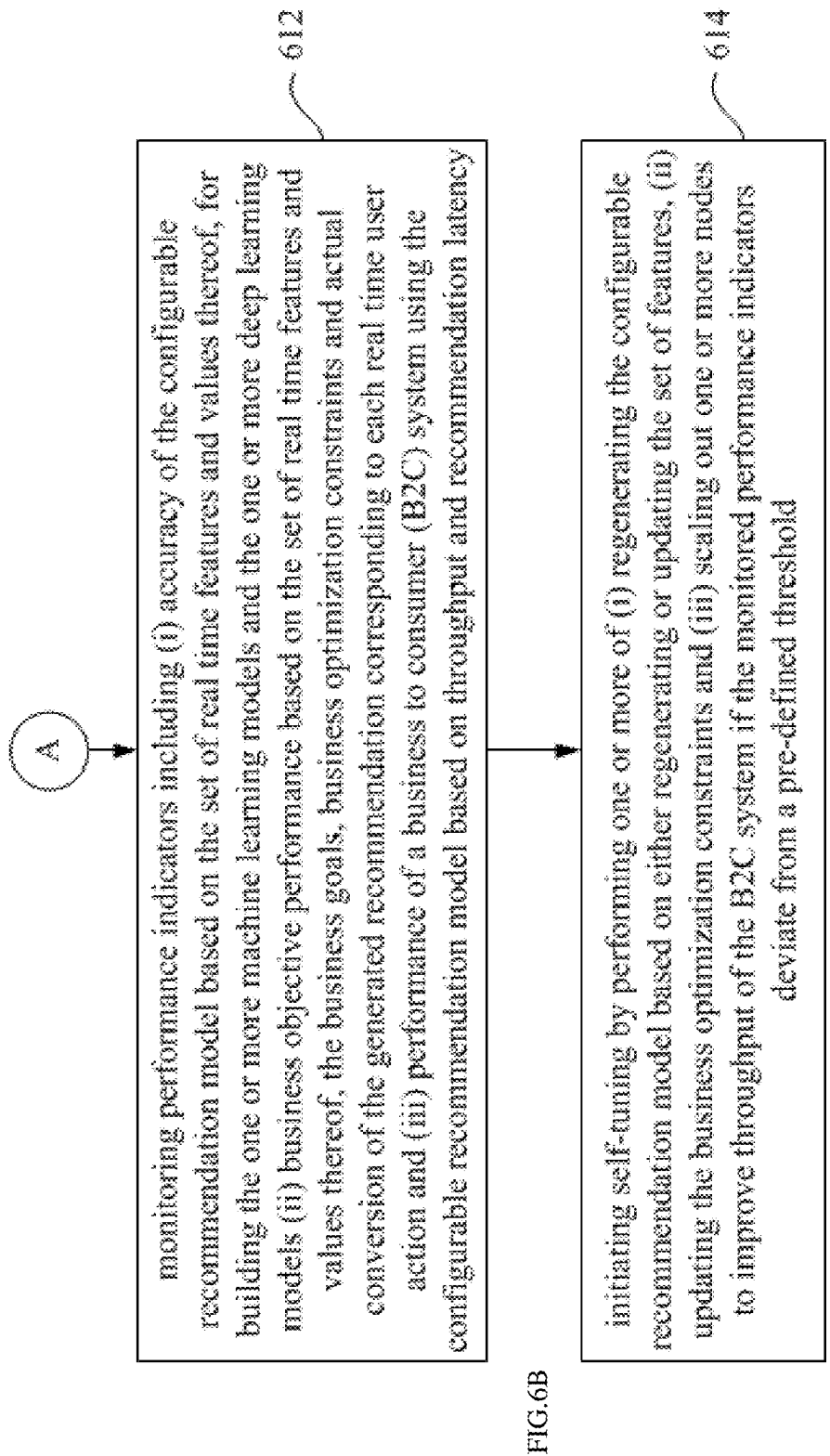
Figure 6C:
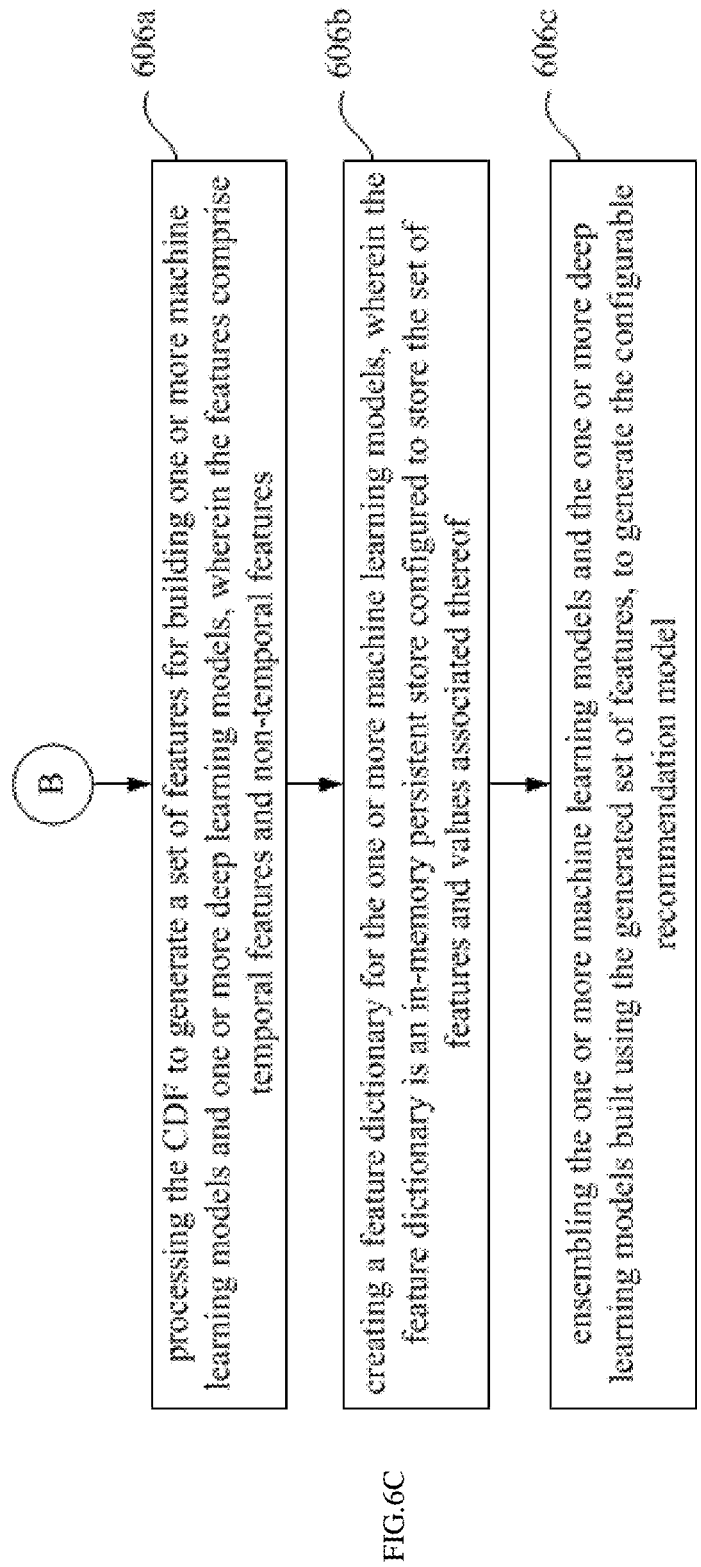
Figure 6D:
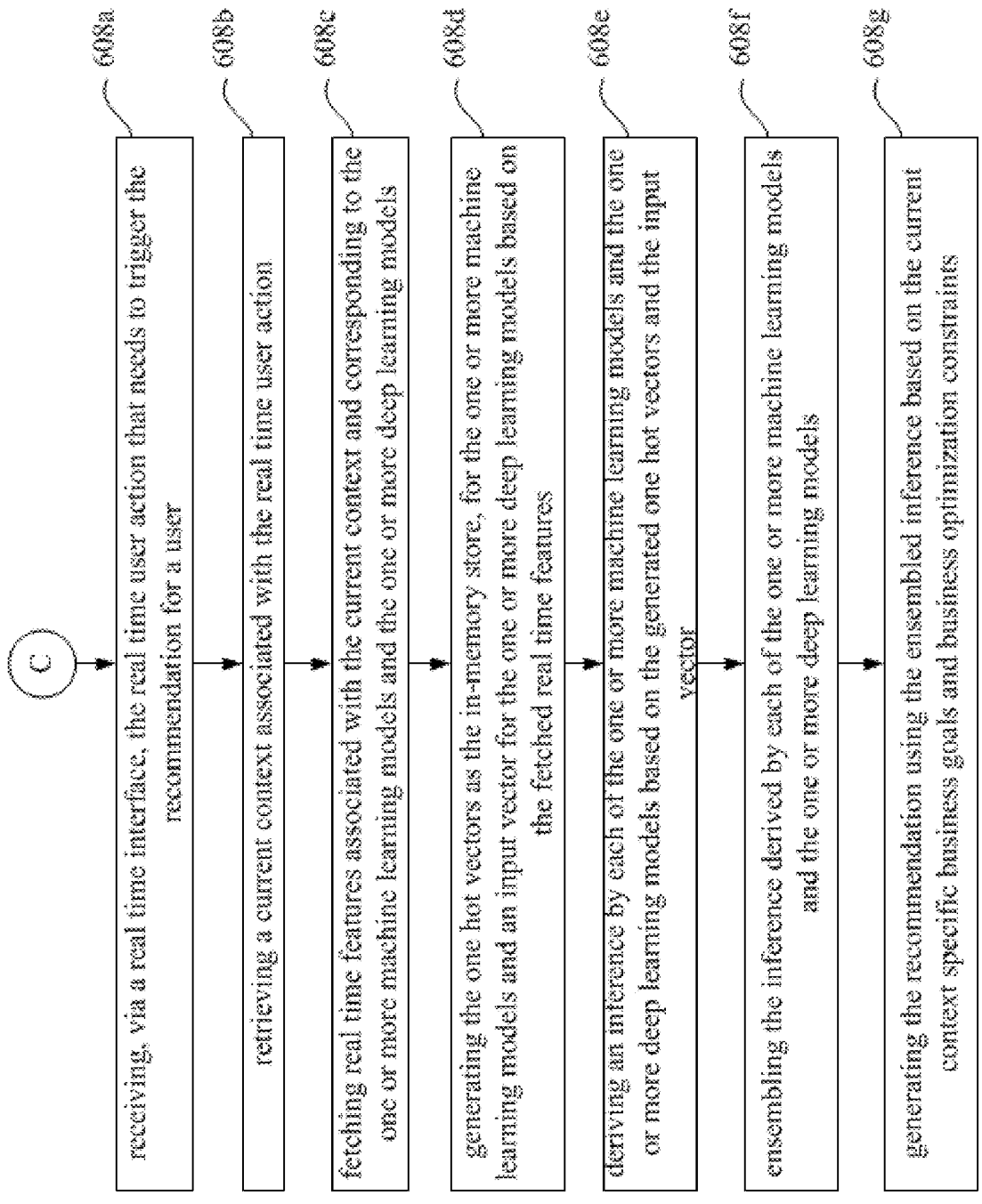

FIG. 5 illustrates interfaces of the system of FIG. 1 in accordance with an embodiment of the present disclosure. For real time deployment of the system 100, on-line user actions on a B2C system employing the system of FIG. 1 are processed and applied on the built configurable recommendation model in real time for deciding a right offer. Therefore, the system of FIG. 1 as shown in FIG. 5 requires two types of interfaces, viz., a batch interface and real time interfaces. The batch interface is used by the data scientist of the B2C system. It takes in history of the raw user data with meta-models describing the domain semantics to build the customer repeat probability prediction model. The real time interfaces capture real time user actions on the B2C system and return relevant offers. It processes the raw user data corresponding to a user's real time cation, infers from the built configurable recommendation model and sends an offer back to the user using a connector for data exchange as illustrated in FIG. 5.

FIG. 6A through FIG. 6D illustrate an exemplary flow diagram for a computer implemented method 600 for real time configurable recommendation using user data, in accordance with an embodiment of the present disclosure. In an embodiment, the system 100 includes one or more data storage devices or memory 102 operatively coupled to the one or more processors 104 and is configured to store instructions configured for execution of steps of the method 600 by the one or more processors 104. The steps of the method 600 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment of the present disclosure, the one or more processors 104 are configured to receive via the batch interface, at step 602, raw user data associated with a plurality of users from a plurality of sources, the raw user data being historical data for building and training the configurable recommendation model of the present disclosure. In an embodiment, Thus in accordance with the present disclosure, a the one or more processors 104 are configured to merge, at step 604, the raw user data into the Common Data Format (CDF), wherein the CDF is a single file with records in the raw user data sorted on associated timestamp values and viewed as a star schema of a fact table joined with dimension tables wherein the fact table pertains to user actions captured in the raw user data and the dimension tables are descriptive data of columns in the fact table. The star schema is flattened as single file having all columns from both the user actions and joined descriptive data. There may be different types of transaction data sets (such as 'order', 'view' etc.) which are appended one after another to create a single CDF and NULL values are replaced with default values. For instance, the public data set in e-commerce viz., PAKDD Recobell Challenge has 3 transaction files (viewlog.csv, orderlog.csv and retargeting_ad_train.csv) and one descriptive file (site_product.csv containing information about the items). The viewlog.csv and orderlog.csv contain details of users viewing and ordering items respectively. The retargeting_ad_train file contains data about impressions (or advertisements) that have been shown to users and their response to those impressions, i.e. whether the users clicked on them.

The CDF is created by appending join of viewlog.csv and site_product.csv to join of orderlog.csv and site_product.csv and appending retargeting_ad_train to it. A new column, 'transaction_type' is added to distinguish records of different transaction data sets. A Telecom industry transaction data set may include information of customers' packages subscriptions, tickets raised by customers and daily usages of each user's accounts. The descriptive data may include customer profile, associated account data and various packages details. The CDF is created by joining the transactions and descriptive data sets as mentioned above.

In accordance with an embodiment of the present disclosure, the step of processing the CDFs is based on (i) a metafile1 structure that defines one or more functions to be executed on each of the columns of the CDF and generates a set of first level features for building the one or more deep learning models; and (ii) a metafile2 structure that defines one or more functions to be executed on each column of the feature dictionary for creating a second level of features in the form of one hot vectors used for building the one or more machine learning models.

In an embodiment, the metafile1 defines the functions to be executed on columns of the CDF, e.g. 'Order count' feature for the PAKDD data sets involves two columns— 'transaction type' and 'quantity'. In an embodiment, the structure of the metafile1, as given in Table 1, captures meaning of each data item and its sensitivity to build the customer repeat probability prediction model and thus abstracting the business domain.

TABLE 1

Metafile1 structure

| Column | Description |
| --- | --- |
| Header | Name of column in the CDF file built from unification of business domain data sources |
| Category | A data set may have many types of event categories - user, product, user product, etc. This defines the type of category for which features need to be built |
| Type | Data type of Column_Header. It can be Categorical, Continuous, Date and Boolean |
| Function | The name of function from library which need to be applied on the column 'Header' |
| Category_Dependency | It defines values of 'Header' for which the Function need to be computed for each of the current value of 'Header'. For example, count function can be executed on 'quantity' column for each of transaction type values as 'Order' and 'View' |

The first column 'Category' defines the level of the features which need to be generated, e.g. PAKDD has only user level features referred as 'UserEventBased' in Table 2, while Telecom data set has four levels of features such as UserEventBased, AccountEventBased, PackageBased, SubscriptionEventBased, as shown in Table 3.

TABLE 2

Metafile1 for e-commerce -PAKDD

| Header | Category | Type | Function | Category_Dependency |
|---|---|---|---|---|
| eval_set | misc | categorical | CreateHotVector | UserEventBased |
| server_time | timestamp | date | occurance_in_week | UserEventBased |
| device | UserEventBased | categorical | dictionary | UserEventBased |
| session_id | UserEventBased | categorical | | UserEventBased |
| uid | UserEventBased | categorical | | |
| transaction_id | UserEventBased | categorical | | |
| quantity | UserEventBased | continuous | | |
| price | UserEventBased | continuous | | |
| category1 | UserEventBased | categorical | dictionary | UserEventBased |
| category2 | UserEventBased | categorical | dictionary | UserEventBased |
| category3 | UserEventBased | categorical | dictionary | UserEventBased |
| category4 | UserEventBased | categorical | dictionary | UserEventBased |
| brand | UserEventBased | categorical | | |
| item_id | UserEventBased | categorical | | UserEventBased |
| transaction_type | UserEventBased | categorical | windows | UserEventBased |
| app_code | UserEventBased | categorical | dictionary | UserEventBased |
| inventory_type | UserEventBased | categorical | dictionary | UserEventBased |
| is_click | UserEventBased | boolean | windows_NeverOccured | UserEventBased |
| is_conversion | UserEventBased | boolean | windows_NeverOccured | UserEventBased |
| model | UserEventBased | categorical | dictionary | UserEventBased |
| network | UserEventBased | categorical | dictionary | UserEventBased |
| os_version | UserEventBased | categorical | dictionary | UserEventBased |
| platform | UserEventBased | categorical | dictionary | UserEventBased |
| dow | timestamp | categorical | | |
| hour_of_day | timestamp | categorical | dictionary | UserEventBased |
| windows | misc | | | |

TABLE 3

Metafile1 for Telecom-HOBS

| Header | Category | Type | Function | Category_Dependency |
|---|---|---|---|---|
| customer_id | UserEventBased | categorical | dictionary, num_days | |
| dob | timestamp | date | dictionary, direct | UserEventBased |
| gender | UserEventBased | categorical | dictionary, num_days | UserEventBased |
| created_on | timestamp | date | dictionary, direct | UserEventBased |
| customer_type | UserEventBased | categorical | dictionary, direct | UserEventBased |
| customer segment | UserEventBased | categorical | dictionary, direct | UserEventBased |
| customer market | UserEventBased | categorical | dictionary, direct | UserEventBased |
| account_id | AccountEventBased | categorical | | |
| account_type_id | AccountEventBased | categorical | dictionary, direct | AccountEventBased |
| package_id | PackageBased | categorical | | |
| package_category_id | PackageBased | categorical | dictionary, direct | PackageBased |
| revenue band | PackageBased | categorical | dictionary, direct | PackageBased |
| charged_amt | AccountEventBased | continuous | dictionary, sumOf | AccountEventBased |
| start_date | timestamp | date | windows, duration | SubscriptionEventBased |
| end_date | timestamp | date | windows, duration | SubscriptionEventBased |
| uom | AccountEventBased | categorical | dictionary, sumOf | AccountEventBased |
| discount_amt | AccountEventBased | continuous | dictionary, sumOf | AccountEventBased |
| product_id | SubscriptionEventBased | categorical | windows, count | SubscriptionEventBased |
| item_catg_id | SubscriptionEventBased | categorical | dictionary, direct | SubscriptionEventBased |
| item_type_id | SubscriptionEventBased | categorical | dictionary, direct | SubscriptionEventBased |
| item_sub_type_id | SubscriptionEventBased | categorical | dictionary, direct | SubscriptionEventBased |
| windows | misc | | | |

The metafile1 also defines the time windows to be used for creating temporal features. The same feature creation functions are applied on the transaction records lying in the time windows to create multiple temporal features. For example, column 'device' in the Table 2 has function 'dictionary' to create XML based feature dictionary on 'device' column for all users and the function 'dictionary' on the column creates the feature dictionary that stores counts of unique occurrences of values in column 'c' for all records and given time windows to create non temporal and temporal features respectively.

In an embodiment, the structure of the metafile2, as given in Table 4, is used to create the second level of features such as complex features for the ML models.

TABLE 4

Metafile2 structure

| Column | Description |
|---|---|
| Feature_Type | It defines the type of feature - temporal or non-temporal |
| Category | This defines the feature levels. It is same as in metafile1 |
| Transaction_Type | Types of transaction such as 'order' and 'view' |
| Feature_Dict_Column | Column created in the feature dictionary to be used for creating complex features (second level of features) |

TABLE 4-continued

Metafile2 structure

| Column | Description |
|---|---|
| Function | Functions to be applied on the Feature_Dict_Column e.g. 'Atleast', 'Average', 'Max-Key', 'Direct', etc. These functions implementations are available through a library and data scientist may choose appropriate function as per a desired feature. |

The metafile2 processes data in the feature dictionary to create the second level of features as one hot vectors used for building the ML model. For example, 'favorable device of a user' as a feature in PAKDD may be created by executing 'MAX' function across count stored on different values of 'device', as shown in Table 5, for instance, MAX on 'laptop_count', 'pc_count' and 'iPhone_count' columns in the feature dictionary created on 'device' column after processing of metafile1. Table 5 shows the metafile2 for PAKDD data set wherein 'transaction_type' may have either 'order', 'view' or 'impression'.

TABLE 5

Metafile2 for e-commerce -PAKDD

| Feature_Type | Category | Transaction_Type | Feature_Dict_Column | Function |
|---|---|---|---|---|
| Date | UserEventBased | order | NA | atleast, direct |
| Date | UserEventBased | impression | is_click | direct |
| Date | UserEventBased | impression | is_conversion | direct |
| All | UserEventBased | order | device | max_key |
| All | UserEventBased | order | category1 | max_key |
| All | UserEventBased | order | Count_on_weekdays | direct |
| All | UserEventBased | order | hour_of-day | max_key |
| All | UserEventBased | impression | app_code | max_key |
| All | UserEventBased | impression | is_click_NeverOccured | direct |
| All | UserEventBased | impression | is_conversion_NeverOccured | direct |
| All | UserEventBased | impression | Count_on_weekdays | direct |
| All | UserEventBased | impression | network | max_key |
| All | UserEventBased | impression | os_version | max_key |
| All | UserEventBased | impression | hour_of_day | max_key |

In accordance with the present disclosure, the one or more processors 104 are configured to generate, at step 606, the configurable recommendation model by firstly processing the CDF, at step 606a, to generate the set of features for building the one or more machine learning models and the one or more deep learning models, wherein the features comprise temporal features and non-temporal features. The feature dictionary is then created, at step 606b, for the one or more machine learning models, wherein the feature dictionary is an in-memory persistent store configured to store the set of features and associated values. Finally the one or more machine learning models and the one or more deep learning models are ensembled, at step 606c, using the generated set of features to generate the configurable recommendation model.

Figure 7:
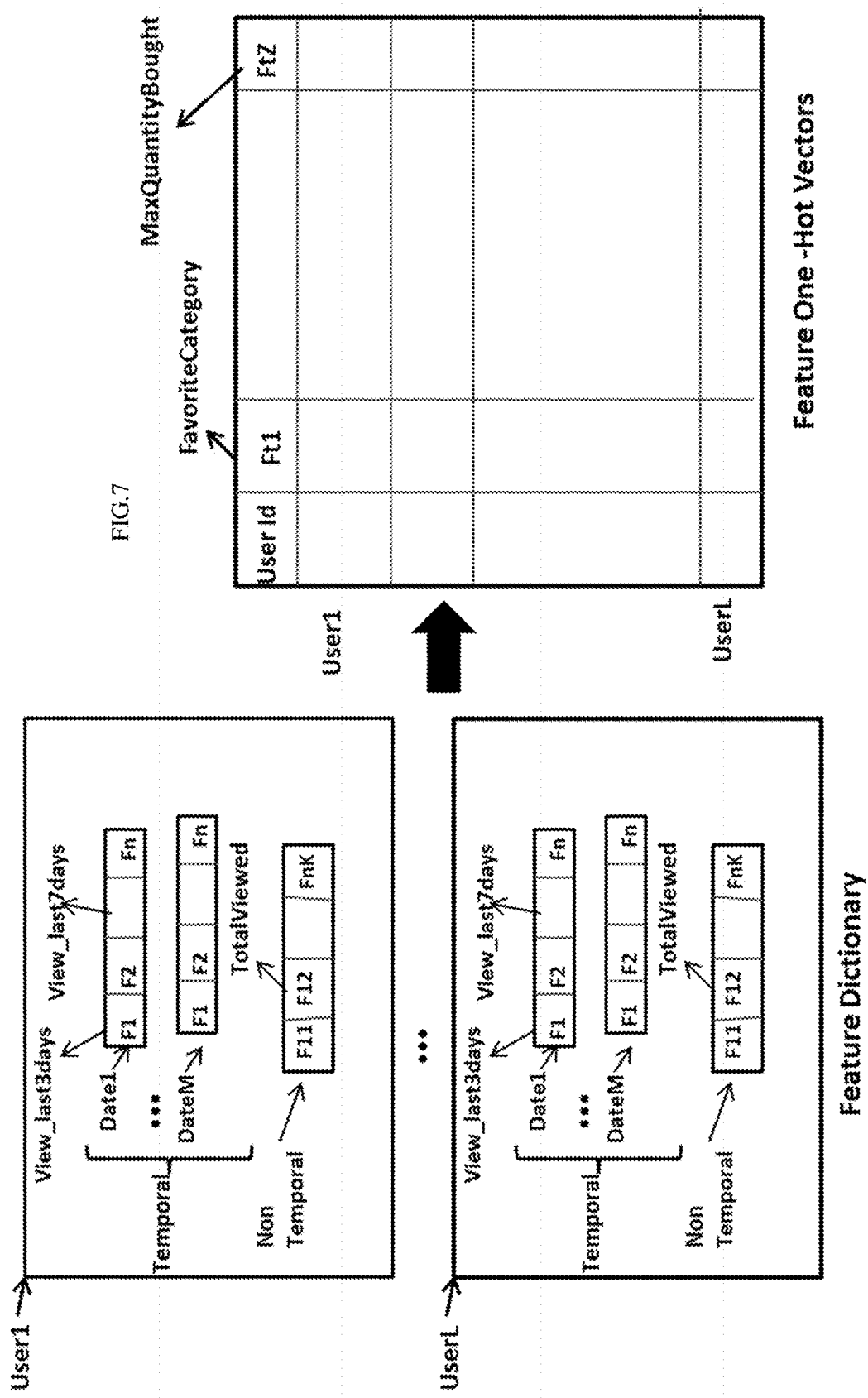
FIG. 7 illustrates an exemplary structure of a feature dictionary in accordance with an embodiment of the present disclosure.
Figure 8:
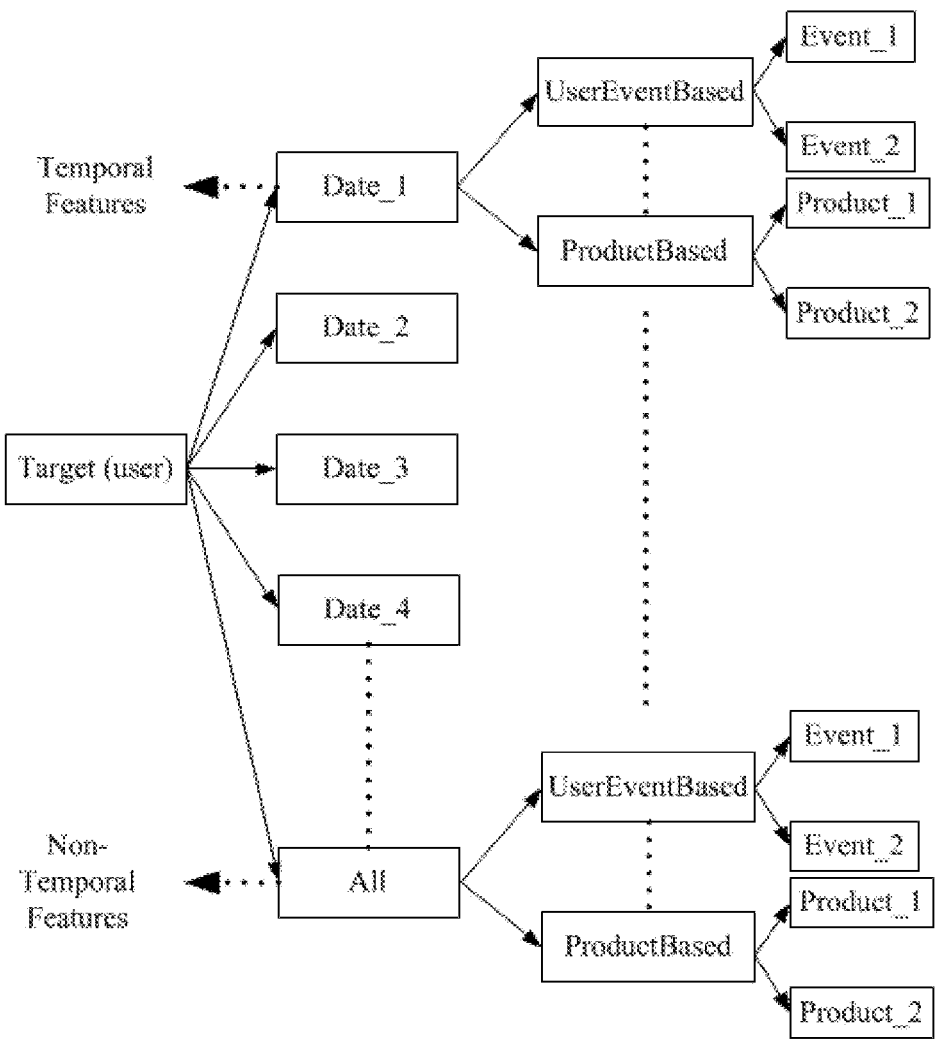
FIG. 8 illustrates a hierarchical representation of the feature dictionary of FIG. 7 in accordance with an embodiment of the present disclosure.

FIG. 7 illustrates an exemplary structure of a feature dictionary in accordance with an embodiment of the present disclosure. The cardinality of column 'Category' of the metafile1 defines the breadth of the feature dictionary. For example, the feature dictionary of the PAKDD data set has one level, while the feature dictionary of the Telecom data set has four levels. FIG. 8 illustrates a hierarchical representation of the feature dictionary of FIG. 7 in accordance with an embodiment of the present disclosure. In accordance with an embodiment of the present disclosure, memory for the feature dictionary is allocated dynamically based on need and is indexed on an identifier 'user id' associated with each user for faster access.

CASE STUDY: In an embodiment, one of the one or more machine learning models is Extreme Gradient Boosting (XGBoost) and one of the one or more deep learning models is Long Short Term Memory (LSTM). A weighted ensemble of inferences from the XGBoost as well as the LSTM is applied to cover a spectrum of features which together improves the accuracy of the configurable recommendation model of the present disclosure. The weights given to the inferences of both the XGBoost and the LSTM are calculated to optimize Area Under the Curve (AUC). A threshold function is then applied on probabilities obtained after the ensemble to optimize the F-Score on the final inference.

The PAKDD Recobell Challenge and the KAGGLE Instacart Challenge datasets in e-commerce domain are used for the case study of the present disclosure to generate the customer repeat probability prediction model. Statistics of the two data sets are given in Table 6 below.

TABLE 6

Statistics of data sets

| Statistics | PAKDD Recobell | KAGGLE Instacart |
|---|---|---|
| # event samples | 4, 80, 26, 835 | 34, 21, 083 |
| # users | 21, 18, 678 | 2, 06, 209 |
| # products | 4, 22, 880 | 49, 688 |
| Dataset duration | 1 Aug. 2016 to 1 Oct. 2016 | 1 Year |
| Imbalance in target | 10% positive class | 4% positive class |

PAKDD Recobell Challenge data set: The task was to predict the probability of conversion when re-target advertisement (impression) was shown to users. The system of the present disclosure was provided with 4 datasets: User view logs, User order logs, Impression (Advertisement) logs and Product metadata (brand, price or category).

Models: The XGBoost and LSTM models were trained on a data having 3.2 lakh training samples. The training labels were whether a user converts on the impression or not. The XGBoost classifier was trained on 271 manually engineered features. The high importance features have been mentioned subsequently. The LSTM model network has a 150 node LSTM layer, followed by a dense layer with 2 nodes and a softmax activation function. An L2 regularizer and RMSprop have been used as an optimizer with a learning rate of 0.001. Another model was built with the XGBoost classifier trained on LSTM Embeddings having 150 features (from 150 nodes of the LSTM model).

XGBoost features: Following are the features created for the XGBoost model.

User Level Features: Impression counts of app code/hod/network/os version, Order counts of category/device/hod were taken, also weekday impression and order counts. These features add information about the most probable set of application codes/hour of day/data network (3G, Wifi, 4G, etc.), operating system versions where an advertisement could be given to a user. A user may be using multiple devices to buy products at an e-commerce website. It may also specify most probable device and most popular hour of the day when a certain product will be bought by a user. Also features like "Never clicked/converted on Impression", based on the hypothesis that user who has never converted/clicked is unlikely to do that in future as well.

User-Product level features: Temporal features for the XGBoost model are also calculated, these are a set of features where each feature specifies the number of impression given to a user in the last 'N' days, where 'N' is the time window and this set is {3, 7, 14, 30, 45} days. The last 'N' days is calculated by taking the date of current active offer as reference. "Conversion/Click counts" on impression contain information about the number of conversion/clicks in the last 'N' days. Also "Order counts/session counts", "Order at least/Order session at least counts" etc. are calculated. These are a set of features where each feature specifies the number of orders/order sessions completed by a user in the last N days.

LSTM features: The LSTM model is trained on temporal features only. Based on the data, there are features like "Categories" which is a set of features that have encoded categorical information about the product categories: category1 and category2, for e.g. Pepsi™ (product) may belong to Soft Drink (category1) and Beverages (category2), "Device/Network/OS version" which encodes the device/data network (3G, Wifi, etc.)/Operating system used by the user. "Price", "Quantity", etc. as price and quantity play an important role in whether the product is bought or not.

Model accuracy results: Area under the ROC curve (AUC) has been used for dealing with highly biased data as in the case of PAKDD Recobell data set along with log loss to evaluate the models. The best AUC and log-loss were obtained when ensemble of inferences from both the models was done. The AUC in the best result was 0.67 and log-loss=0.05. This was compared with the winning solution of the challenge which had a log-loss of =0.0453. In Table 7, XGBoost271 refers to an XGBoost Classifier model that was trained on 271 features having hyperparameters mentioned in the Model Configuration for XGBoost above and XGLSTMEmb refers to an XGBoost Classifier trained on LSTM Embeddings (150).

Kaggle Instacart challenge data set: The task was to predict which previously purchased products are in a user's next order, given a particular day of week and time. The system of the present disclosure was provided with previous orders of every user. Each order contains a basket of products bought in that order. There were also data sets containing information about the product categories like aisle and department to which a product belongs. The focus on understanding temporal behavior patterns makes the problem fairly different from standard item recommendation, where user needs and preferences are often assumed to be relatively constant across short windows of time.

Models: 85 lakh training samples were created, each representing a user-product pair. Here, for each user-product pair, these products were the ones present in the user's previous orders. Experiments were performed with different gradient boosting models like LightGBM and XGBoost and also a deep LSTM model. It was observed that a weighted ensemble over the inferences obtained from both the models proved to be the best model. The weights of the ensemble were 0.65 to 0.35. A threshold of 0.180 was used to form the positive class(indicate presence of the product in the order). Also to handle the large class imbalance, a random sub sampling was done for training the LSTM model, and it was observed that gradient boosting handles class imbalance quite well implicitly.

XGBoost features: Following are various level of features used for building the XGBoost model:

User Level Features: Every buyer has his/her own peculiarities, also many of the purchasing patterns are affected by the demographic factors. But demographic data is not always available, in such cases the user similarity is handled by doing in-depth analysis of the user buying history, and thus profiling the user. Features like "Average days between orders", "Percentage reorder", "Preferable time of ordering", "Days since last order" etc. are used. These help in finding out how actively the user purchases, the preference patterns in terms of time, and days of week, and how much does the user experiment with new products.

Product Level Features: Product level features are used when a product is intended for a particular demography. They capture not only the distinction based on price, quantity and type of product, but also what other items are bought along with, its priority in terms of adding it to cart, reorder frequency etc. We use features like "Average basket size, when the product is bought", "Number of purchases from an aisle and department", "percentage of reordering from this aisle's or departments products", "Is the product a priority product, like if its added to cart first most times" etc.

User-Product level features: Every user has some favorites, same applies in terms of buying behavior. Users may have some particular brand or type of product which they are more likely to purchase from. It was also uncovered that for each product there are particular times, and days of week when users tend towards buying them. Features like "Last ordered days for a product for a user", "Average number of days after which a product is ordered by a user", "Number of purchases of a product by a user in the last 3, 5, 7 . . . days", "Distinct number of products ordered by a user, to understand how many products does a user try" etc. A total of 76 features were calculated which are given as input to the XGBoost model.

LSTM features: The LSTM model is trained on temporal features at both user and user-product levels.

User Level: These features are calculated at order level and are independent of the product in each order, like: "Days since" which is the days passed since prior order of the user. This helps in accessing the right delay in the users order. "Basket size" specifies the basket size of the current order. It helps in providing information about the number of products bought by the user hence helps in predicting the top k products for each user. "Percentage new products" is the percentage of new products bought in the current order. It provides intuition about the number of old/new products in the users predicted order, also when a user is keen on trying new products. Also the difference (in days) of the order from the last order is calculated and provides information about the delay in subsequent orders.

User-Product Level features are calculated for order-product pairs like, "Presence" specifies the presence of a product in the current order. If the product is present, the value of this feature is 1 else 0. Similarly, "Position in cart" represents the add to cart position of the product in the order. If the product is added to cart after adding two products in the same cart then the value of this feature will be 3 and "Delta" represents the time difference of previous order's day from the current order's day.

Model accuracy results: The F-Score was used as a metric to evaluate the models to keep the results comparable with the Instacart challenge winner. Two leader boards were used to evaluate the model. They were public (33 percent test data) and private leader-board (66 percent test data). An F-Score of 0.3826 was obtained on the private leader-board and 0.3843 on the public leader-board using the automated feature engineering, while the winning solution achieves F-score of 0.4091 in the private leaderboard and 0.4097 in the public leaderboard. In Table 8, LGB refers to Light GBM, 80L LSTM refers to the LSTM trained on 80 lakh samples.

TABLE 8

Model accuracy for Instacart challenge

| Model | Private F-Score | Public F-Score |
|---|---|---|
| 80L LSTM | 0.3774 | 0.3783 |
| LGBM | 0.3833 | 0.3837 |
| EnsembleLGBM | 0.3826 | 0.3843 |
| Winner | 0.4091 | 0.4097 |

EXPERIMENTAL EVALUATION OF THE CONFIGURABLE RECOMMENDATION MODEL: The technology stack of the present disclosure is deployed on a six node cluster, each node of a configuration including Intel CPU dual core with 56 cores and 256 GB RAM with 1 GB NIC. Choice of technology for high performance and deployment details with tuning is given in Table 9 below.

TABLE 9

Stack deployment and tuning

| Technology | Deployment | Tuning |
|---|---|---|
| Kafka 2.10 | 3 nodes cluster | 10 partitions at each node |
| Ignite 1.9 | 2 nodes cluster | Cache Memory = Off-Heaped, Indexing on UserId, Java Heap Size of Server = 4 GB, Cache-Partition = UserId |
| HDFS 2.6 | 1 node | Default |
| Tornado 4.5 | 2 shared nodes | Default |

The accuracy of the configurable recommendation model of the present disclosure is evaluated by comparing the accuracy of manually built model for both PAKDD and Kaggle test data sets using Python™ 2.3 and Keras library for XGBoost and LSTM respectively. The results are as given in Table 10 below. For PAKDD data set, the configurable recommendation model captures all the features used by the manually built model, therefore, the outputs from both models are quite similar. The difference in actual prediction probabilities is 90th percentile 0.007426, while the maximum difference is 0.008974. This shows that the difference is very small and negligible. The accuracy of the configurable recommendation model is AUC of 0.67 which is same as in the manual version. For Kaggle data set the difference in predicted outputs of the models are higher. This is because the manual process of model building has lesser number of features as compared to the one in the configurable recommendation model. The manual model did not have high granular window features and special features like 'the order in which items were added to the cart'. The manual model was coded in Python™ on a single machine and hence could not support more features while the configurable recommendation model is deployed on big-data cluster with efficient data store which brings capability of processing enriched features. The difference in actual prediction probabilities is 90th percentile 0.26458, while the maximum difference is 0.768331. The accuracy of the configurable recommendation model is better with F-score of 0.826656308956 while the manual model has an F-score of 0.825879480635. A closer analysis of the predicted values shows that the prediction by manually built model lies closer to a predefined threshold (0.5) showing lesser separation as compared to the configurable recommendation model of the present disclosure i.e. the predictions given by the configurable recommendation model are not only accurate but also much more decisive.

TABLE 10

Model performance comparison

| Model version | PAKDD AUC | KAGGLE F-Score |
|---|---|---|
| Manual | 0.67 | 0.825879480635 |
| Configurable recommendation model | 0.67 | 0.826656308956 |

Figure 9:
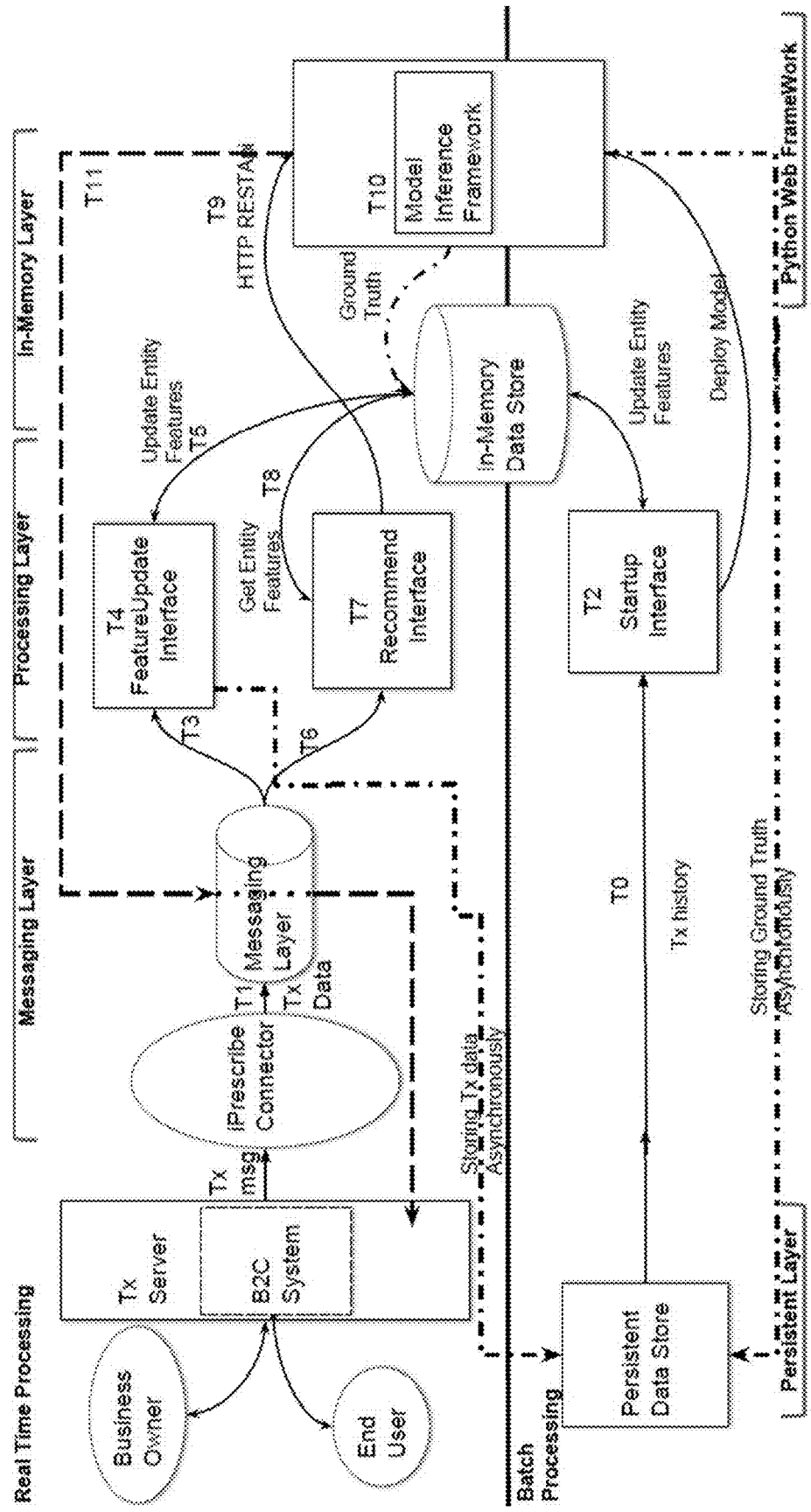
FIG. 9 illustrates processing at the interfaces and the various layers comprising the system of FIG. 1 in accordance with an embodiment of the present disclosure.

As discussed above, in an embodiment, one of the one or more machine learning models is Extreme Gradient Boosting (XGBoost) and one of the one or more deep learning models is Long Short Term Memory (LSTM). In accordance with the present disclosure, the XGBoost and LSTM model implementations are optimized to reduce inference time by the models. In an embodiment, the ensemble of XGBoost and LSTM models in Keras and Python™ respectively may be used to build the configurable recommendation model. The LSTM and XGBoost models require creating features from the raw user data and then building the respective models. The raw user data depicts temporal behavior of users which is captures in the features and need to be updated continuously. For instance, a feature indicating a "user's buying behavior in the last two hours" is different in the morning and evening of a day. A current value of such features improves the accuracy of the XGBoost model. These features are kept updated by capturing the raw user data from the B2C system through one of the real time interfaces illustrated in FIG. 5. Again the present disclosure also provides a real time high performance streaming architecture that achieves low recommendation latency (of the order of 90th percentile 38 milliseconds) and a scalable high throughput using open source big data technology. FIG. 9 illustrates processing at the interfaces and the various layers comprising the system of FIG. 1 in accordance with an embodiment of the present disclosure. To support a modular architecture, a message layer is provided to receive on-line raw user data from the B2C system, a stream processing layer is provided to process incoming real time raw user data, the feature dictionary is provided to store features and Python Web Framework (PWF) layer is provided for model building and inference. The multi-layer architecture stack brings in agility to technology change. Again, the present disclosure addresses high scale throughput and low latency architecture as described hereinafter.

Since the features are accessed in real time both for model inference and updation, the feature dictionary access time and model design play a critical role in recommendation latency. Accordingly, the feature dictionary is an in-memory persistent store to ensure both performance and durability respectively. The streaming raw usage data is processed in parallel for model inference to ensure increase in throughput with increase in workload i.e. scalable. Use of LSTM or any such deep learning model on raw usage data requires a sequence of historical data for model inference leading to an increase in sequence size over a period of time and hence model inference time as well. In order to have constant model inference time, the LSTM inference method has been optimized as explained hereinafter. To ensure minimal communication delay across architecture layers that may lead to increase in latency, the technology stack is suitably chosen.

As stated above, the batch interface also referred as 'Startup' is provided to build the configurable recommendation model using the raw usage data and deploy the model in memory. The two real time interfaces are referred as 'Recommend' and 'FeatureUpdate' for getting the best recommendation or offer for a user and for updating the model features respectively. FIG. 9 shows the detailed processing involved at each layer of the architecture stack for the three interfaces with timing notations as given in Table 11 below.

TABLE 11

Time notations used in FIG. 9

| Notation | Description |
| --- | --- |
| T0 | Time to read a raw usage data history file |
| T1 | Time to receive a raw usage data from the connector to the message layer |
| T2 | Time to create and store features and one-hot vectors for training both LSTM and XGBoost models |
| T3 | Time taken for a raw usage data to reach the stream processing layer from the message layer |
| T4 | Time to process the raw usage data to get new value of features |
| T5 | Time to access and update data in the feature dictionary |
| T6 | Time taken by the raw usage data from the messaging layer to the stream processing layer |
| T7 | Time to process the raw usage data to get feature one-hot vector of the user |
| T8 | Time to access data in the feature dictionary |
| T9 | Time to send data from the stream processing layer to a python model inference layer |
| T10 | Time spent in model inference |
| T11 | Time taken to send offer from the PWF layer to the message layer |

Startup interface: This interface performs complete pipeline of building the configurable recommendation model from raw usage data—feature creation, training and testing the model. The feature creation process reads the raw usage data file and builds feature one-hot vectors which are also stored in the feature dictionary. The one-hot vectors for each target (e.g. user) are used to build the XGBoost model. Similarly, the LSTM model is built using the transaction sequences for each user. The performance metric for this interface is model building time which includes time to create feature one-hot vectors and then training the model, this is referred as Execution Time.

$$ExecutionTime = T0 + T2$$

Recommend interface: This real time interface is invoked through the connector for every action (raw usage data) which needs to trigger an offer or recommendation for a user. This is a closed loop system, therefore, the performance metric of interest for this interface are recommendation latency (RL) and throughput. This involves retrieving the user's current context from an incoming raw usage data, fetching its features for both the models, preparing feature one-hot vectors for XGBoost and input vector/matrix for LSTM models, ensemble inference of both the models based on business goals and business optimization constraints to get the recommendation or offer for the user. Finally, the offer is sent back to the B2C system through the connector. RL is time taken to send the offer to the B2C system once a raw usage data is received.

$$RL = T1 + T6 + T7 + T8 + T9 + T10 + T11$$

Throughput is measured as number of messages serviced per second. Ideally, throughput increases linearly with increase in ingestion rate of the raw usage data till the system is fully utilized. Therefore, $$\text{Throughput} = \text{Min}\left\{\frac{\text{cores}_{msg}}{T7 + T8}, \frac{\text{cores}_{infr}}{T10}\right\}$$

where $\text{cores}_{msg}$ and $\text{cores}_{infr}$ are number of cores at message (raw user data) processing and model inference layers respectively.

FeatureUpdate interface: This real time interface is invoked through the connector for every action on the B2C system. Its purpose is to keep the features updated for every action. This is an open system therefore, the performance metric for this interface is only throughput. The workflow involves retrieving user details from an incoming raw usage data, fetching the user's existing features, updating the features with the current context and storing it back in the feature store. Throughput is the maximum number of messages serviced per second while maximally utilizing the underlying system.

$$\text{Throughput} = (1/\text{ProcessTime} * \text{Numcores})$$

where Numcores is number of cores in the stream processing layer and $$\text{ProcessTime} = T1 + T3 + T4 + T5$$

In an embodiment of the present disclosure, the one or more processors 104 are configured to generate, at step 608, the recommendation or the offer in response to the real time user action using the generated configurable recommendation model, wherein firstly, at step 608a, the real time user action that needs to trigger the recommendation is received via the real time interface. Then a current context associated with the real time user action is retrieved at step 608b. Real time features associated with the current context and corresponding to the one or more machine learning models and the one or more deep learning models are fetched at step 608c. In an embodiment, at step 608d, the one hot vectors are generated as the in-memory store, for the one or more machine learning models and an input vector is generated for the one or more deep learning models based on the fetched real time features. An inference is derived by each of the one or more machine learning models and the one or more deep learning models based on the generated one hot vectors and the input vector at step 608e. The inference derived by each of the one or more machine learning models and the one or more deep learning models are ensembled at step 608*f*. Finally, at step, 608*g*, the recommendation is generated using the ensembled inference based on the current context specific business goals and business optimization constraints. Again, in accordance with an embodiment of the present disclosure, the one or more processors 104 are configured to dynamically update the feature dictionary, at step 610, with the current context associated with each of the real time features.

The performance of the real time interfaces depend on the feature dictionary access time, processing time and model inference time. The key components of the architecture are design of the feature dictionary for faster access and technology stack encapsulating multiple layer architecture as discussed hereinafter.

Features are created for both XGBoost and LSTM model by processing the raw usage data. For XGBoost, to capture user's persona and temporal behavior, two categories of features—non-temporal and temporal respectively are defined for each user as shown FIG. 7, which is similar to JSON data type. The feature access time is reduced by sharding and creating indexes on 'user id', so data for a user can be accessed in O(1) rather than that of sequential scan.

Each user's features are calculated in two passes. The first pass on transaction (raw usage data) history creates features' cumulative values for each user, e.g. total count of product view in last 3 days, shown as 'F1' in FIG. 7. The second pass on the features' cumulative values creates feature one hot vectors for users, e.g. favorite category of user, shown as 'Ft1' in FIG. 7. To reduce the processing time at the 'Recommend' interface, both the feature dictionary and the feature one-hot vectors are kept in in-memory store.

Technology stack choices: In an embodiment of the present disclosure, Python™ is used to build the models. In a naive approach, the configurable recommendation model is built offline and deployed using Python Web Framework (PWF) such as Flask and Tornado. The connector captures real time actions of the B2C system and sends it to the PWF to get model inference. The architecture faced challenges including large disk access time, scalability and impact on B2C system performance. In an embodiment, a five layer architecture stack is provided outside the B2C system.

Message and Persistent store layers: The open source technology, Kafka, and Hadoop Distributed File System (HDFS) are considered for horizontally scalable message layer and persistent store respectively. All the actions and transactions of users on B2C system are captured as real time raw user data through the real time interfaces. These are stored asynchronously in persistent store for future model rebuilding. The received raw user data is also co-related with actual conversions for a given offer or recommendation and is asynchronously stored as ground truth both in persistent and in-memory store for model rebuilding and updating feature store in real time respectively.

In-memory store layer: The schema of the feature dictionary depends on the data sets, therefore, technology for in-memory layer supports dynamic schema creation and JSON data types. The 'Recommend' and 'FeatureUpdate' interfaces access the feature dictionary concurrently for reading and updating only respectively, therefore, the feature dictionary need not have strong transaction consistency. The 'Recommend' interface may read feature values without reflecting updates of few recent actions which may not impact model inference accuracy.

Stream processing layer: In an embodiment, for scalable parallel data processing, Spark and Ignite are considered. Spark supports Python™, as PySpark, but has no memory store and Ignite does not support Python™ but has in-memory store. Spark being Java™ based, it has additional Python™ workers which lead to double serialization overheads. Moreover, Spark is a micro batch stream processing engine, therefore the RL is bounded by the batch window size. Ignite supports per message processing and is a single technology for both stream processing and in-memory store; this reduces the message processing time to few milliseconds only.

Python Web Framework Layer (PWF): In an embodiment, Python Web Framework is used for model inference. Real time raw usage data is processed in parallel by stream processing layer and sent to PWF for model inference using HTTP RestAPI calls. Each Python™ process executes independent of any other process, therefore, the PWF layer can be scaled out with more resources on increase in workload to ensure constant model inference time.

In accordance with an embodiment of the present disclosure, the XGBoost and LSTM models are optimized for high scalability with low recommendation latency. In an embodiment, an ensemble of the XGBoost and LSTM models is used to build the configurable recommendation model. Model inference time is reduced by batching users' feature one-hot vectors. It implies that raw user data received at the 'Recommend' interface within a few milliseconds is processed in parallel and sent to the PWF layer together for model inference.

Optimization in model building: History of the raw user data captures static information about entities and dynamic information about actions on entities. In an embodiment, the PAKDD Recobell challenge and the KAGGLE Instacart challenge data sets as shown in Table 6 above are used to build the configurable recommendation model. In an embodiment, the machine learning model is XGBoost where grid search is used to select optimal parameter values for following XGBoost model parameters including colsample_bylevel, colsample_bytree, learning_rate, max depth, min_child_weight, n_estimators and subsample. In an embodiment, LSTM deep neural network is used. The model structure has 150 nodes and 20 nodes LSTM layer for PAKDD Recobell and Instacart respectively, followed by a dense layer with 2 nodes and a softmax activation function. An L2 regularizer and RMSprop are also used as an optimizer with a learning rate of 0.001. A weighted ensemble of predictions from XGBoost as well as LSTM is applied to cover the spectrum of features which together improve the accuracy. The weights given to predictions of both the algorithms are calculated to optimize the Area Under Curve (AUC). Threshold function is applied on the probabilities obtained after the ensemble to optimize the F-Score on the final predictions. Model accuracy using the PAKDD and the KAGGLE data sets are as shown under experimental evaluation of the configurable recommendation model provided above.

LSTM optimization: LSTM, being a sequence based model, the model inference requires passing the whole sequence of transaction history to the network architecture. This leads to large model inference time which may increase over a period of time with increase in number of sequences. Naive approach of LSTM model inference technique takes 36 hours to train 22 million records and take 831 ms for a user with history of 10,000 samples. This is due to looping back of last hidden states and cell states for new sequence vector. In accordance with the present disclosure, the looping back of network can be unfolded as multiple sequences of the LSTM units, each feeding to next in sequence. The equations for each LSTM unit maybe represented as below:

$$i_t = fl(W^i x_t + U^i h_{t-1})$$

$$f_t = fl(W^f x_t + U^f h_{t-1})$$

$$o_t = fl(W^o x_t + U^o h_{t-1})$$

$$\tilde{c}_t = \tan h(W^c x_t + U^c h_{t-1})$$

$$c_t = f_t * c_{t-1} + i_t * \tilde{c}_t$$

It may be noted from the above equations that only $h_t$ and $c_t$ are passed to the next time step. At any given point of time, the values of $h_t$ and $c_t$ together represent the LSTM network state trained with the historical data till 't−1'. Therefore, in accordance with the present disclosure, an inference based on the raw user data derived at time 't' by the LSTM model is performed using a current hidden state $h_t$ and a current memory state $c_t$ of each cell constituting the LSTM model, wherein the current hidden state $h_t$ and the current memory state $c_t$ are trained with historical data until 't−1' and stored in the feature dictionary for each user and fetched when generating an inference in response to a real time user action thereby reducing latency in inference time. Thus, in accordance with the present disclosure, the LSTM model inference for a message at time 't' can be done in constant time. The feature dictionary stores $h_t$ and $c_t$ for each user during model training in the 'Startup' interface. These values are updated for each incoming raw user data in the 'Feature-Update' interface. Moreover, Keras library predict function incurs 67 ms and 25 ms for model inference using small size with more matrix multiplications and large size with less matrix multiplications respectively, to predict for one user; most of the time is taken up by core tensorflow backend built-in methods TF_ExtendGraph and TF_Run, other internal calls of tensorflow. The present disclosure has its own implementation of 'predict' function in Java™ using JBLAS 1.2.4, LAPACK and ATLAS for optimized matrix multiplication. The mapping of categorical columns to unique integers is done using hashing instead of data store to reduce inference time further.

Technology stack optimization: Technology choices in the present disclosure for high scalability and low latency are as represented in Table 12 below.

TABLE 12

Technology choices

| Architecture Layer | Technology |
|---|---|
| Messaging layer | Kafka |
| Stream processing layer | Spark, PySpark, Ignite |
| In-memory store | MongoDB, Ignite, Redis |
| Python Web Framework | Flask, Tornado |
| Persistent store layer | HDFS |

Kafka, the messaging layer, is partitioned with multiple topics to support higher ingestion rate, however, performance gains with increase in number of partitions are limited by disk access overheads in Kafka for messages persistence. The performance optimizations in rest of the technology stack is discussed below.

PySpark+Mongo (PSM) architecture: The architecture comprises Spark interfaces with MongoDB as the feature dictionary through Pymongo connector. Three connectors—Spark-Mongo, Pymongo and Java-Mongo connectors have been considered and data access latency of 975 ms, 12 ms and 8 ms respectively are observed. This is because, Spark connector with MongoDB requires translation of Spark dataframe to/from python dictionary. This is avoided in Pymongo connector since it supports reading and writing python dictionary structures in MongoDB. Redis is also considered in place of MongoDB. However, MongoDB gives 26% better throughput than Redis since Redis requires replication server. The micro batch window size in Spark depends on the processing delay at each of the core. The batch received at Spark is repartitioned on user identifier so that the raw user data corresponding to a user can be processed by same thread and avoids multiple accesses to MongoDB for the same user. This architecture could support average RL as 5 seconds only due to micro batch processing and double serialization overheads in PySpark. Reducing the batch window size build ups task queue for PySpark which may increase average RL exponentially.

Spark+Mongo+PWF (SMP) Architecture: To eliminate PySpark double serialization overheads, model inference is done using PWF—Flask with Celery and Tornado. Raw user data is processed into feature one-hot vectors in Spark and sent to the PWF for model inference. The communication between them needs to be asynchronous otherwise slowest technology will limit the performance of other layers in the stack. In Flask, queuing up of raw user data at Celery introduced overheads of 100 ms. Tornado being asynchronous and better performer than Flask as web service, is used as PWF in the architecture. The model is hosted as web service on Tornado server, with facility of multiple processes, which listens to a particular port. However using same port to serve larger number of requests limits the throughput. Therefore, multiple Tornado processes are started independently, each one listening to different port. Multiple process deployment of PWF (Tornado) leads to sub linear speed up with vertical scaling of a machine and hence increases the model inference latency unlike single server which incurs only 12 ms i.e. system is not scalable. This is because the XGBoost library spawns multiple threads and these threads wait on Python GIL. The number of threads can be limited to one for XGBoost by setting environment variable OMP_NUM_THREADS=1. Further, to avoid context switching on cores across different Torando processes, each Tornado process is attached to a core using environment variable 'Task set'. In this architecture after optimization, average RL is 78 ms, where time taken for message processing in Spark is 50 ms including 28 ms for time spent in accessing MongoDB.

Figure 10:
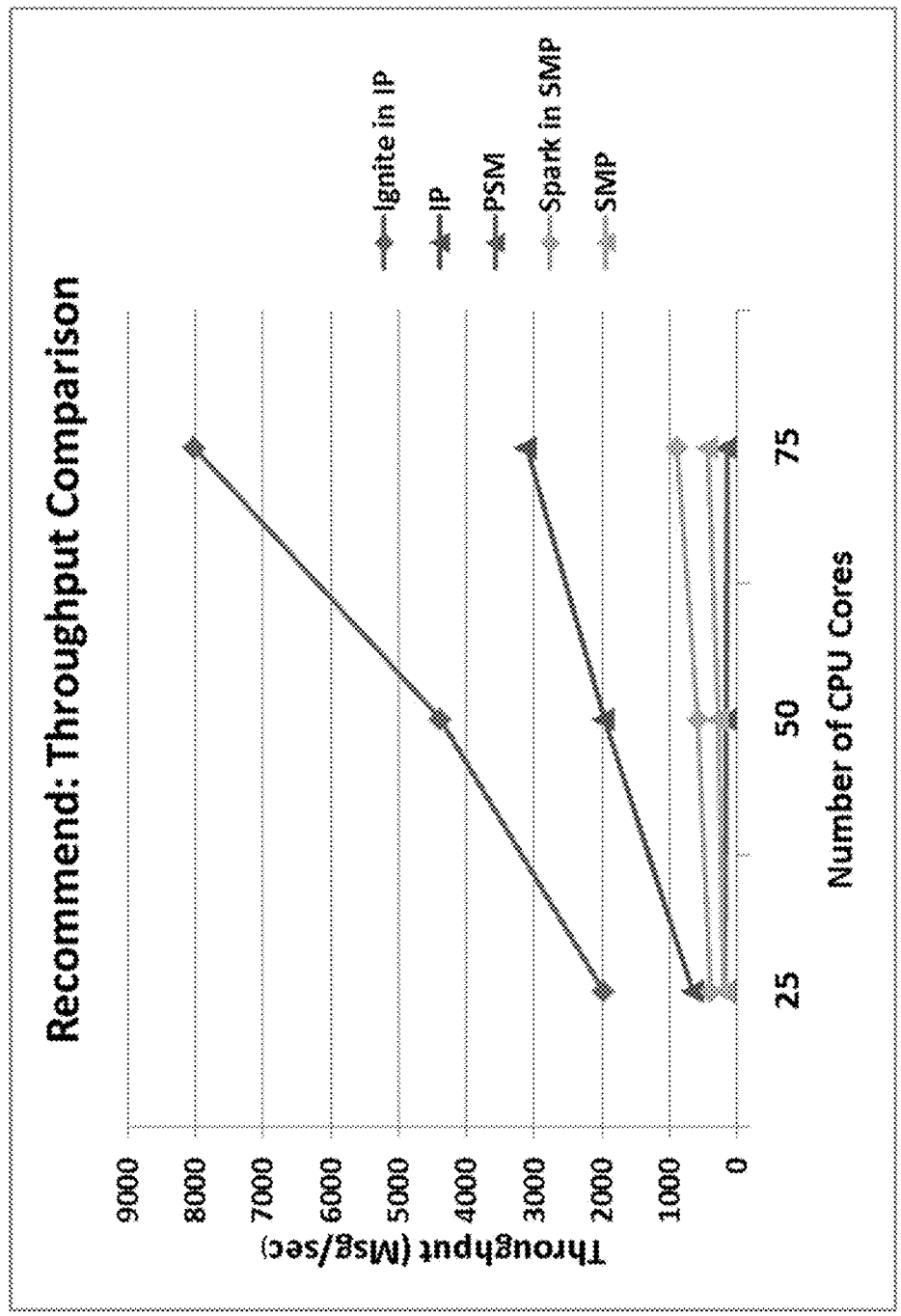
FIG. 10 and FIG. 11 illustrate throughput comparison with increase in number of cores and data ingestion rate of PySpark+Mongo (PSM), Spark+Mongo+Python Web based Framework (SMP) and Ignite+Python Web based Framework architecture technology stacks for Recommend and FeatureUpdate interfaces respectively.
Figure 11:
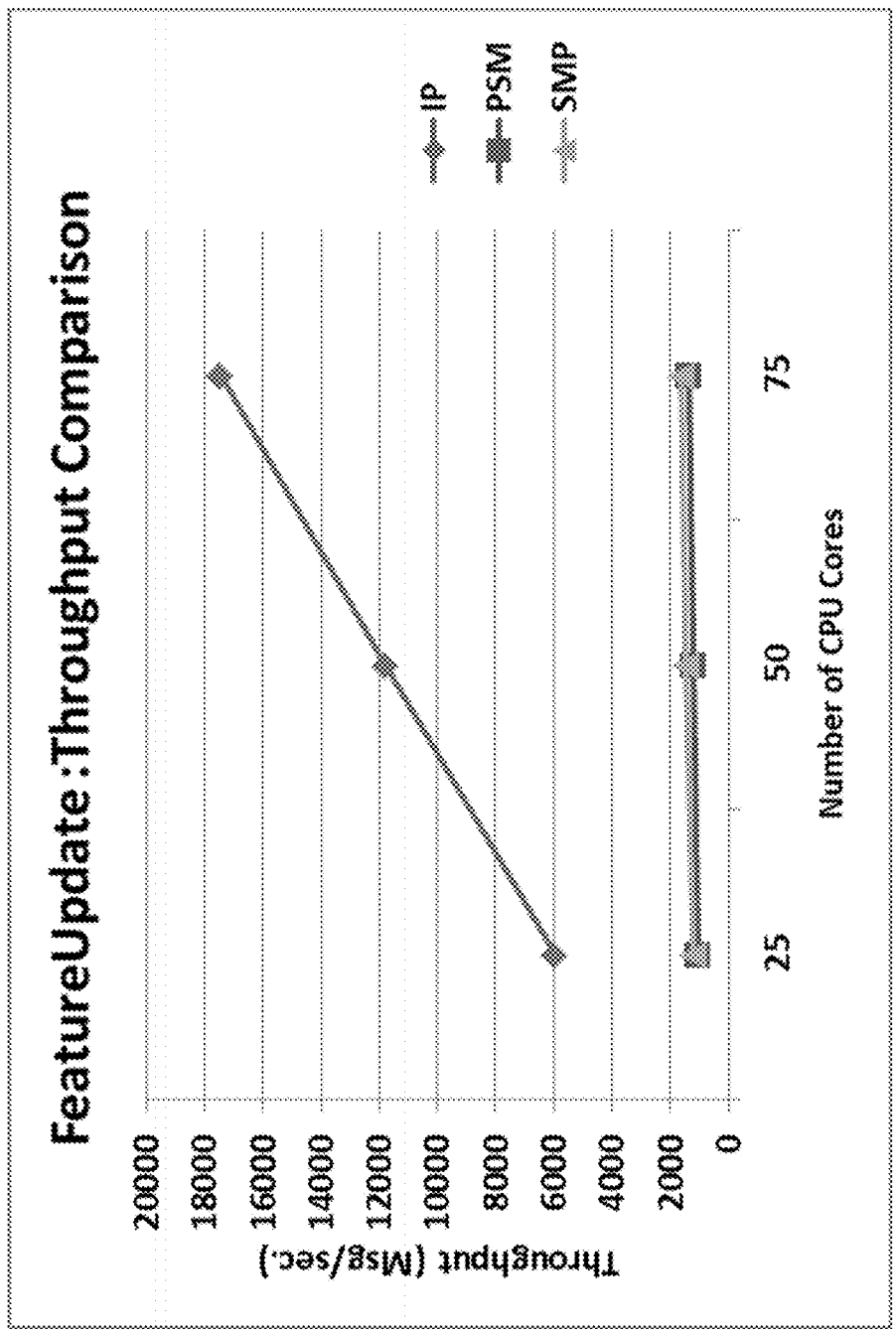

Ignite+PWF (IP) Architecture: Ignite is both per message stream processing and in-memory store technology. Ignite Cache, key value store, is used to store features. User identifier is used as the key to store and partition data across nodes in the Ignite cluster. Ignite StreamVisitor is being used for processing each key-value tuple from incoming data streams. In Ignite cluster, StreamVisitor collocates processing locally on the node where the data is cached to avoid data shuffling. This reduces message processing time to 14 ms. However, Ignite-Kafka connector introduces overheads of 45 ms. Therefore, web sockets are used to send raw user data from the connector to Ignite client which reduces the communication delay to 2 ms with the tradeoff of Kafka's reliability and availability. In this architecture after optimization, average RL is 30 ms. To support high ingestion rate, multiple Ignite client instances are launched with every instance listening to separate web socket. FIG. 10 and FIG. 11 illustrate throughput comparison with increase in number of cores and data ingestion rate of PySpark+Mongo (PSM), Spark+Mongo+Python Web based Framework (SMP) and Ignite+Python Web based Framework architecture technology stacks for Recommend and FeatureUpdate interfaces respectively. PySpark and Spark based architecture have less throughput and large processing time due to small task size, micro batch based processing and data access from MongoDB. Ignite and Torando throughput scale linearly with increase in data rate. Therefore, the technology stack chosen is IP technology stack consisting of Kafka, Ignite, Tornado and HDFS.

Experimental Evaluation of the Performance of the Optimized Architecture:

Deployment system details: The technology stack is deployed on six node cluster each node of configuration, Intel CPU dual core with 56 cores and 256 GB RAM with 1 GB NIC. Choice of technology while design exploration of the architecture and their deployment details with tuning is given in Table 12 and Table 13 respectively. Kafka and MongoDB are low on resource utilization in this case, therefore they are deployed on shared nodes.

TABLE 13

Technology deployment and tuning

| Technology | Deployment | Tuning |
| --- | --- | --- |
| Kafka 2.10 | 3 nodes cluster | 10 partitions at each node |
| PySpark 2.1 | 2 nodes cluster | Shuffle partitions kept twice of number of cores allocated to PySpark |
| Spark 2.1 | 2 nodes cluster | Shuffle partitions kept twice of number of cores allocated to Spark |
| Ignite 1.9 | 2 nodes cluster | Cache Memory = Off-Heaped, Indexing on UserId, Java Heap Size of Server = 4 GB, Cache-Partition = UserId |
| MongoDB 3.4.6 | 1 shared node | Data is indexed and sharded on UserId |
| HDFS 2.6 | 1 node | Default |
| Tornado 4.5 | 2 shared nodes | Default |

Benchmark Workload: The performance of the architecture is evaluated on PAKDD and Instacart data sets. PAKDD has 22 million transaction records including 0.3 million impression records. The built model predicts whether a customer will click the given advertisement. Instacart has 2,06,209 users with 50,000 products, where the built model predicts whether a particular customer will buy a particular product. The model can be used for all products to predict products in a customer's basket for next order. The model is built on the initial data set in Startup Interface. The impression records of PAKDD have been extrapolated to generate large number of impression records. These impression records are played as stream and fed to the real time interfaces. These records are sorted on clock time so it simulates the behavior of user clicks. Similarly, test data of Instacart consisting of user records is simulated as a stream to benchmark the real time interfaces. The ingestion rate of the records is controlled and system throughput and utilizations are measured. For example, for PAKDD data sets, the Recommend interface is ingested with stream of impression records and FeatureUpdate interface is ingested with the stream of records having mix of all order, view and impression records. We have benchmarked the system for 100% workload on the Recommend interface, 100% workload on FeatureUpdate and controlled ingestion rate on both the interfaces in ratio of 80% and 20% respectively on FeatureUpdate and Recommend interfaces.

Performance Results: The Startup Interface reads the CDF file, prepares users' feature one-hot vectors in parallel by processing transaction records using meta-model and builds the ensemble of XGBoost and LSTM model in Python™ framework. The execution time for this interface is 183 minutes and 269 minutes for PAKDD and Instacart data sets respectively. The details are given in Table 14 for feature creations and training time for each of the models. XGBoost model for Instacart is trained for 10× less number of users than that of PAKDD model, therefore XGBoost model building time is faster in Instacart. LSTM model requires history of each sample during training and LSTM model for Instacart is trained for all user-product pairs which is 30× more than that in PAKDD, which lead to higher LSTM model training time. Recommend interface has two performance metrics—Recommendation Latency (RL) and throughput. RL is measured on single node starting with 100 msg/sec as ingestion rate and gradually increasing to 1000 msg/sec. In the experimental setup, RL time components, T1=T3=T6=1 ms. Table 15 shows average value of the rest of the RL time components for PAKDD.

TABLE 15

PAKDD: RL timings as shown in FIG. 9

| | Stack | | | | | | | |
| --- | --- | --- | --- | --- | --- | --- | --- | --- |
| | T4 | T5 | T6 | T7 | T8 | T9 | T10 | T11 |
| PSM | 18 | 25 | 1 | 197 | 25 | NA | 736 | 1 |
| SMP | 12 | 25 | 1 | 14 | 25 | 1 | 12 | 1 |
| IP | 7.3 | 1 | 1 | 14 | 1 | 1 | 12 | 3 |

Figure 13:
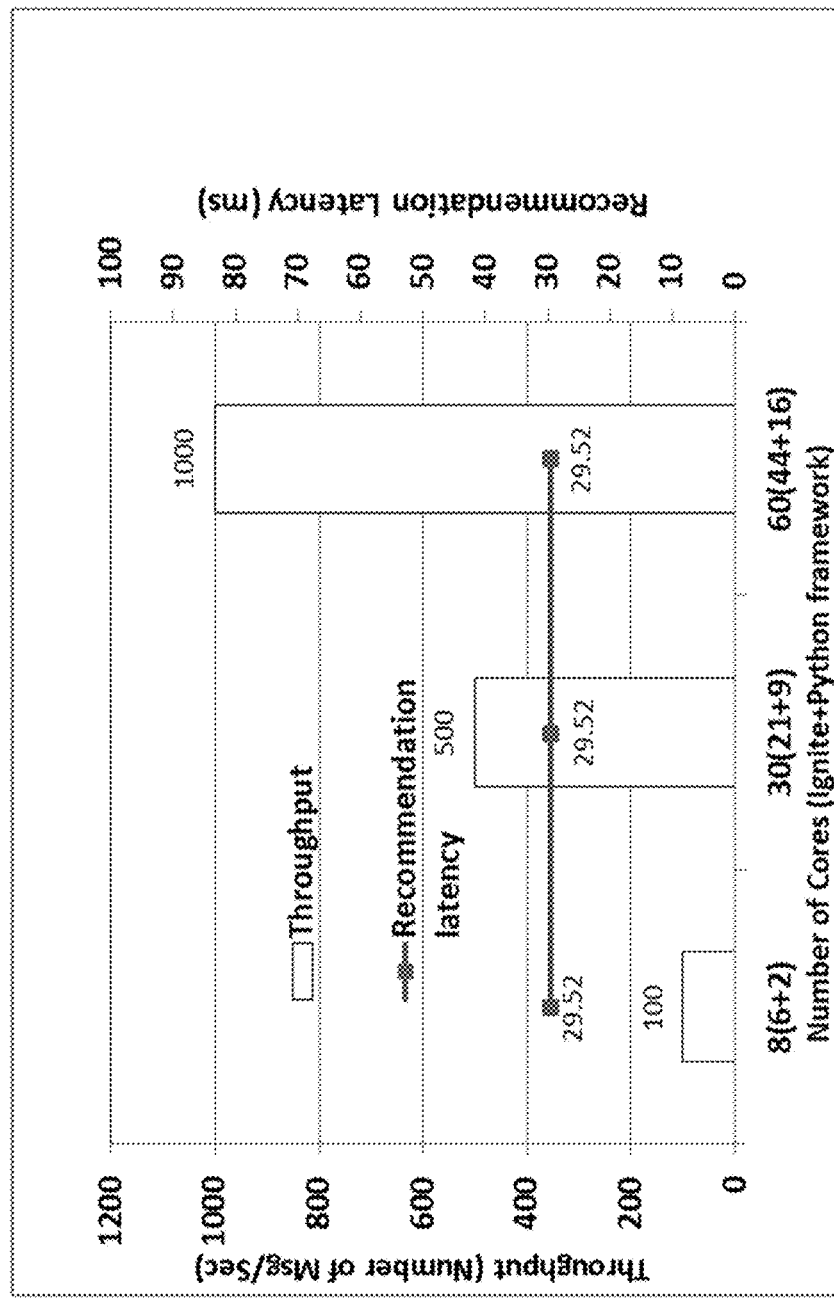
FIG. 13 illustrates performance in terms of throughput and average recommendation latency with increase in data ingestion rate for recommend interface of the system of FIG. 1, in accordance with an embodiment of the present disclosure.
Figure 14:
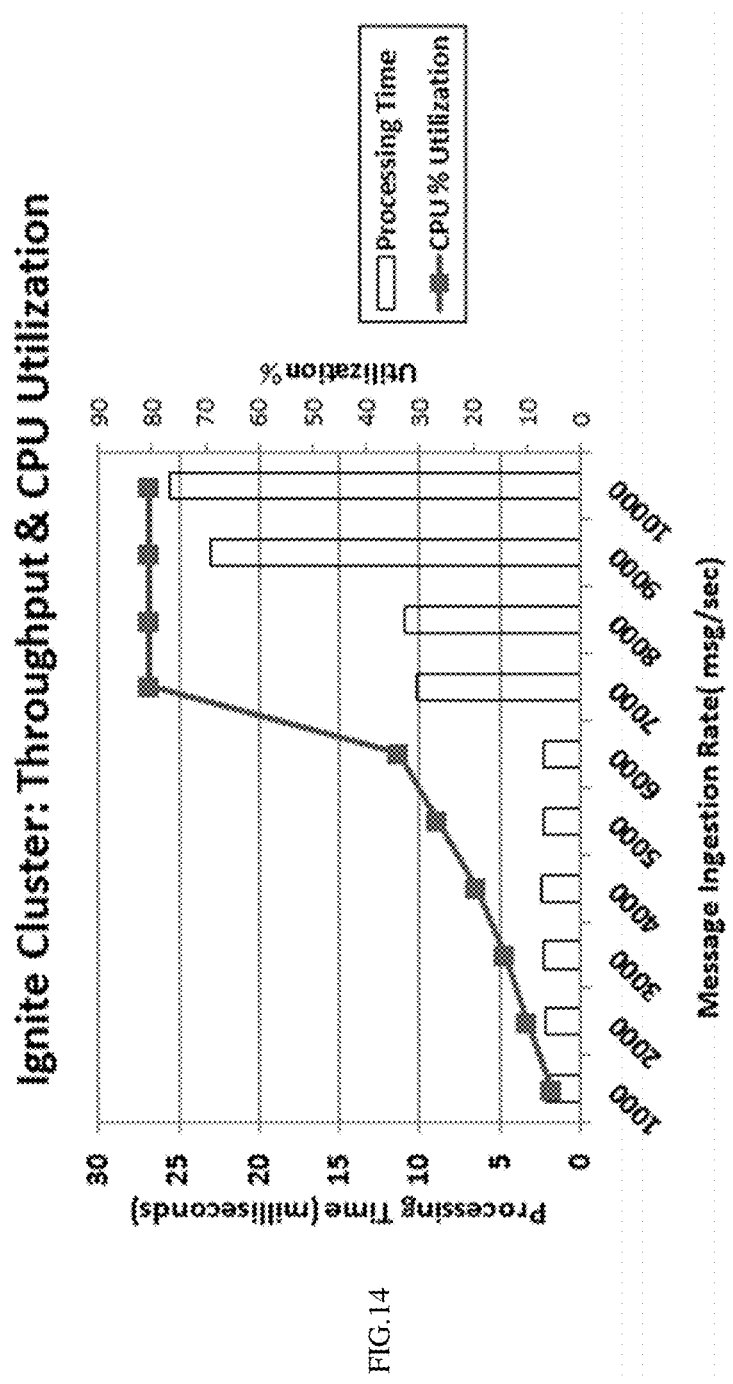
FIG. 14 illustrates utilization of a stream processing layer of the system of FIG. 1, in accordance with an embodiment of the present disclosure.

For Instacart data sets, model inference time per user-product inference is similar, however, model inference need to be done for all user product pairs to predict user's basket. Therefore, for average 40 products per user in basket, time to fetch feature one-hot vectors for XGBoost model is 81 ms and for LSTM model inference is 161 ms in the stream processing layer. This implies, T7=81+161=242 ms and XGBoost model inference time in PWF per user is T10=480 ms. T7 does not increase linearly opposed to T10. The feature dictionary is indexed on user id, therefore single fetch from Ignite Cache gets all feature one-hot vectors for a user on all products. Using equation RL=T1+T6+T7+T8+T9+T10+T11, the average recommendation latency per user for PAKDD and Kaggle Instacart challenges are 38 ms and 842 ms respectively. It is noted that for single inference, 25 ms and 38 ms as 50th percentile and 90th percentile recommendation latency respectively is supported. FIG. 13 illustrates performance in terms of throughput and average recommendation latency with increase in data ingestion rate for the recommend interface of the system of FIG. 1, in accordance with an embodiment of the present disclosure. It may be noted that there is a linear increase in throughput with increase in workload. However, Ignite technology supports linear increase in throughput till the cluster is 80% utilized as shown in FIG. 14 that illustrates utilization of a stream processing layer of the system of FIG. 1, in accordance with an embodiment of the present disclosure. Therefore, for high scalability, the Ignite layer scales out on 80% utilization.

Figure 15:
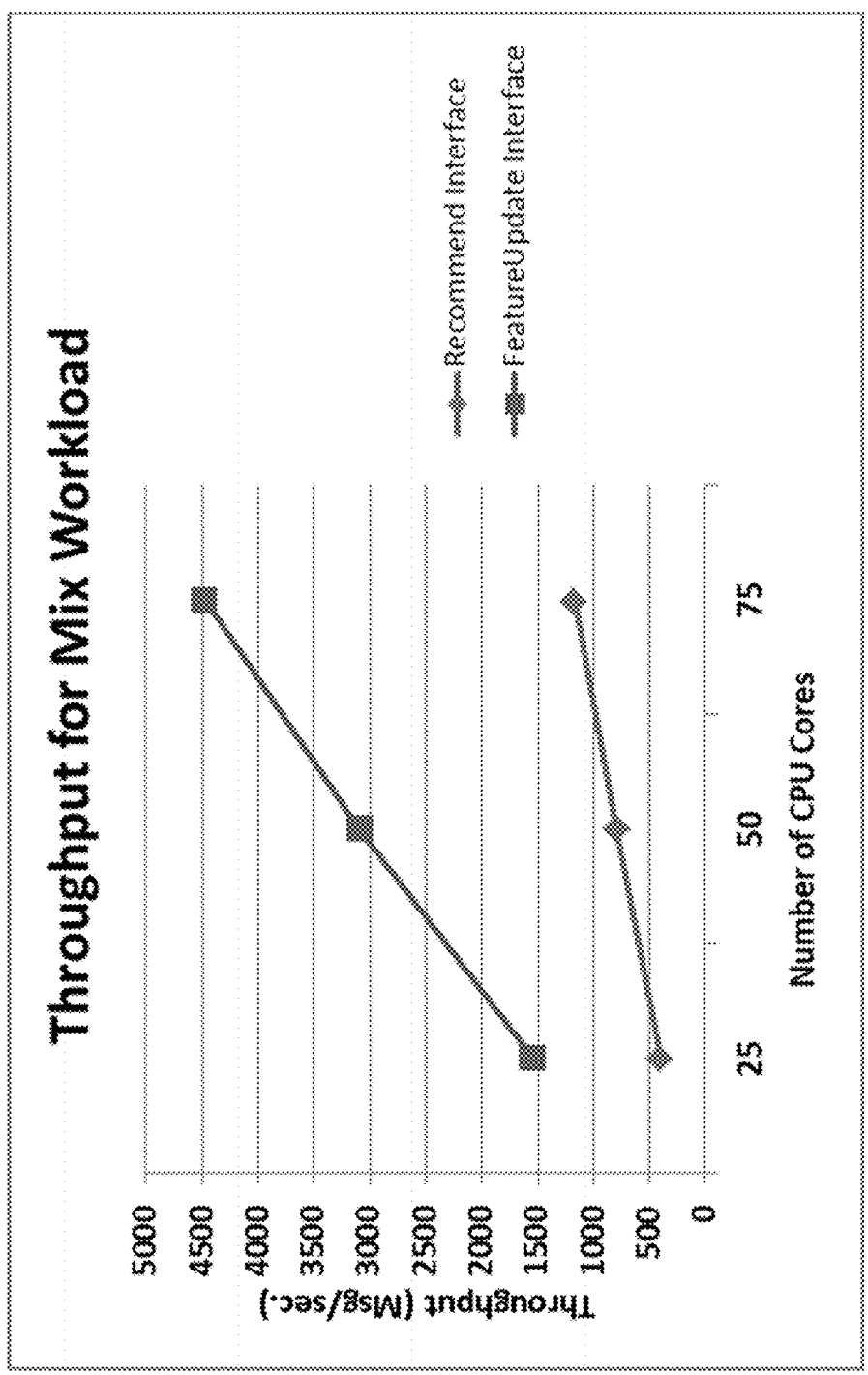
FIG. 15 illustrates throughput of the system of FIG. 1 for mix workload, in accordance with an embodiment of the present disclosure.

FeatureUpdate interface processing time, using equation $$\text{Throughput} = \text{Min}\left\{\frac{\text{cores}_{msg}}{T7+T8}, \frac{\text{cores}_{infr}}{T10}\right\}$$

and Table 15, is 7.3 ms which includes 6 ms for updating $h_t$ and $c_t$ for LSTM model and 1.3 ms for updating the feature dictionary. FeatureUpdate processing is done in Ignite in parallel across all the available cores, therefore, FeatureUpdate throughput linearly increases with number of cores and data ingestion rate, as shown in FIG. 15 that illustrates throughput of the system of FIG. 1 for mix workload, in accordance with an embodiment of the present disclosure. It also shows that throughput of Recommend interface does not degrade in presence of processing on FeatureUpdate interface.

In accordance with an embodiment of the present disclosure, the configurable recommendation model has three performance indicators, viz., the accuracy of the configurable recommendation model, business objective performance and performance of the a B2C system using the configurable recommendation model. The performance of the configurable recommendation model may degrade of accuracy of the deployed model degrades when the features get old or new features emerge which are not used in the model building process. The performance may degrade if the business objectives are not met either due to change in environment or business process. The performance may also degrade if the B2C system perceives reduced throughput and increased recommendation latency on increase in workload.

In accordance with an embodiment of the present disclosure, the one or more processors 104 are configured to monitor, at step 612, the three performance indicators including accuracy of the configurable recommendation model based on the set of real time features and associated values, for building the one or more machine learning models and the one or more deep learning models (ii) the business objective performance based on the set of real time features and values thereof, the business goals, business optimization constraints and actual conversion of the generated recommendation corresponding to each real time user action and (iii) performance of the B2C system using the configurable recommendation model based on throughput and recommendation latency. In accordance with the present disclosure, the expression 'throughput' refers to the number of concurrent recommendations supported by the configurable recommendation model and the expression 'recommendation latency' refers to the time delay in between a user action and providing the recommendation to the user.

Figure 12:
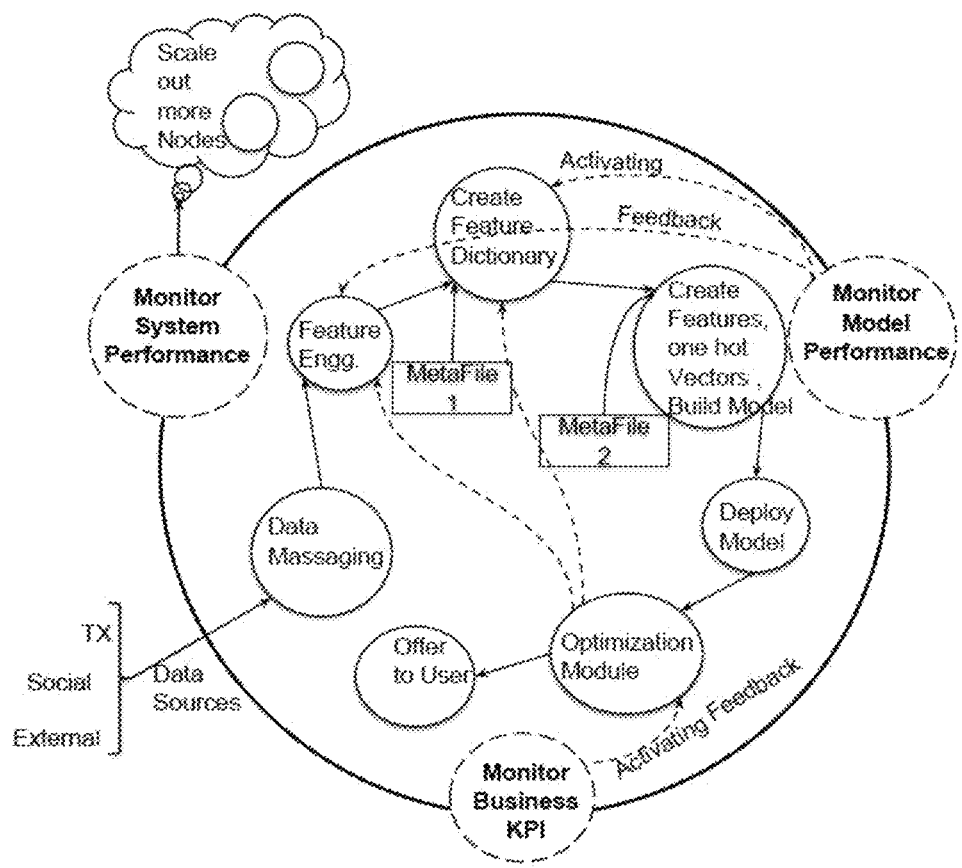
FIG. 12 illustrates self-tuning performed by the system of FIG. 1 in accordance with an embodiment of the present disclosure.

In accordance with the present disclosure, the one or more processors 104 are configured to initiate, at step 614, self-tuning by performing one or more of (i) regenerating the configurable recommendation model based on either regenerating or updating the set of features, (ii) updating the business optimization constraints and (iii) scaling out one or more nodes to improve throughput of the B2C system if the monitored performance indicators deviate from a pre-defined threshold. FIG. 12 illustrates self-tuning performed by the system of FIG. 1 in accordance with an embodiment of the present disclosure. Once deployed, the configurable recommendation model works in an autonomous manner, with periodic monitoring of the three performance indicators that activates a feedback loop to initiate self-tuning whenever there is a deviation in the performance indicators. In an embodiment, the architecture of the configurable recommendation model may be augmented with orchestration framework such as zookeeper to trigger and facilitate the process of automation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (600) comprising the steps of:
   receiving, by one or more hardware processors, via a batch interface, raw user data associated with a plurality of users from a plurality of sources (602);
   merging, by the one or more hardware processors, the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table (604); and
   generating, by the one or more hardware processors, a configurable recommendation model (606) by:
      processing the CDF to generate a set of features for building one or more machine learning models and one or more deep learning models, wherein the features comprise temporal features and non-temporal features (606*a*);
      creating a feature dictionary for the one or more machine learning models, wherein the feature dictionary is an in-memory persistent store configured to store the set of features and values associated thereof (606*b*); and
      ensembling the one or more machine learning models and the one or more deep learning models built using the generated set of features, to generate the configurable recommendation model (606*c*).

2. The processor implemented method of claim 1, wherein one of the one or more machine learning models is Extreme Gradient Boosting (XGBoost) and one of the one or more deep learning models is Long Short Term Memory (LSTM).

3. The processor implemented method of claim 2, wherein an inference based on the raw user data derived at time T by the LSTM model is performed using a current hidden state $h_t$ and a current memory state $c_t$ of each cell constituting the LSTM model, wherein the current hidden state $h_t$ and the current memory state $c_t$ are trained with historical data until 't−1' and stored in the feature dictionary for each user and fetched when generating an inference in response to a real time user action thereby reducing latency in inference time.

4. The processor implemented method of claim 1, wherein the step of processing the CDFs is based on (i) a metafile1 structure that defines one or more functions to be executed on each of the columns of the CDF and generates a set of first level features for building the one or more deep learning models; and (ii) a metafile2 structure that defines one or more functions to be executed on each column of the feature dictionary for creating a second level of features in the form of one hot vectors used for building the one or more machine learning models.

5. The processor implemented method of claim 1, wherein the set of features are categorized as user level features, product level features and user-product level features and the temporal features and the non-temporal features are identified for each of the categorized levels.

6. The processor implemented method of claim 1, further comprising generating the recommendation in response to the real time user action using the generated configurable recommendation model (608) by:
   receiving by the one or more hardware processors, via a real time interface, the real time user action that needs to trigger the recommendation for a user (608*a*);
   retrieving, by the one or more hardware processors, a current context associated with the real time user action (608*b*);
   fetching, by the one or more hardware processors, real time features associated with the current context and corresponding to the one or more machine learning models and the one or more deep learning models (608*c*);
   generating, by the one or more hardware processors, the one hot vectors as the in-memory store, for the one or more machine learning models and an input vector for the one or more deep learning models based on the fetched real time features (608*d*);
   deriving an inference by each of the one or more machine learning models and the one or more deep learning models based on the generated one hot vectors and the input vector (608*e*);
   ensembling, by the one or more hardware processors, the inference derived by each of the one or more machine learning models and the one or more deep learning models (608*f*); and
   generating, by the one or more hardware processors, the recommendation using the ensembled inference based on the current context specific business goals and business optimization constraints (608*g*).

7. The processor implemented method of claim 6, further comprising dynamically updating the feature dictionary with the current context associated with each of the real time features (610).

8. The processor implemented method of claim 6 further comprising:
   monitoring performance indicators including (i) accuracy of the configurable recommendation model based on the set of real time features and values thereof, for building the one or more machine learning models and the one or more deep learning models (ii) business objective performance based on the set of real time features and values thereof, the business goals, business optimization constraints and actual conversion of the generated recommendation corresponding to each real time user action and (iii) performance of a business to consumer (B2C) system using the configurable recommendation model based on throughput and recommendation latency (612); and
   initiating self-tuning by performing one or more of (i) regenerating the configurable recommendation model based on either regenerating or updating the set of features, (ii) updating the business optimization constraints and (iii) scaling out one or more nodes to improve throughput of the B2C system if the monitored performance indicators deviate from a pre-defined threshold (614).

9. The processor implemented method of claim 1, wherein memory for the feature dictionary is allocated dynamically based on need and is indexed on an identifier associated with each user for faster access.

10. A system (100) comprising:
one or more data storage devices (102) operatively coupled to one or more hardware processors (104) and configured to store instructions configured for execution by the one or more hardware processors to:
receive, via a batch interface, raw user data associated with a plurality of users from a plurality of sources;
merge the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table; and
generate a configurable recommendation model by:
processing the CDF to generate a set of features for building one or more machine learning models and one or more deep learning models, wherein the features comprise temporal features and non-temporal features;
creating a feature dictionary for the one or more machine learning models, wherein the feature dictionary is an in-memory persistent store configured to store the set of features and values associated thereof; and
ensembling the one or more machine learning models and the one or more deep learning models built using the generated set of features, to generate the configurable recommendation model.

11. The system of claim 10, wherein one of the one or more machine learning models is Extreme Gradient Boosting (XGBoost) and one of the one or more deep learning models is Long Short Term Memory (LSTM).

12. The system of claim 11, wherein an inference based on the raw user data derived at time 't' by the LSTM model is performed using a current hidden state $h_t$ and a current memory state $c_t$ of each cell constituting the LSTM model, wherein the current hidden state $h_t$ and the current memory state $c_t$ are trained with historical data until 't−1' and stored in the feature dictionary for each user and fetched when generating an inference in response to a real time user action thereby reducing latency in inference time.

13. The system of claim 11, wherein memory for the feature dictionary is allocated dynamically based on need and is indexed on an identifier associated with each user for faster access.

14. The system of claim 10, wherein the one or more hardware processors are further configured to process the CDFs based on (i) a metafile1 structure that defines one or more functions to be executed on each of the columns of the CDF and generates a set of first level features for building the one or more deep learning models; and (ii) a metafile2 structure that defines one or more functions to be executed on each column of the feature dictionary for creating a second level of features in the form of one hot vectors used for building the one or more machine learning models.

15. The system of claim 10, wherein the set of features are categorized as user level features, product level features and user-product level features and the temporal features and the non-temporal features are identified for each of the categorized levels.

16. The system of claim 10, wherein the one or more hardware processors are further configured to generate the recommendation in response to the real time user action using the generated configurable recommendation model by:
receiving via a real time interface, the real time user action that needs to trigger the recommendation for a user;
retrieving a current context associated with the real time user action;
fetching real time features associated with the current context and corresponding to the one or more machine learning models and the one or more deep learning models;
generating the one hot vectors as the in-memory store, for the one or more machine learning models and an input vector for the one or more deep learning models based on the fetched real time features;
deriving an inference by each of the one or more machine learning models and the one or more deep learning models based on the generated one hot vectors and the input vector;
ensembling the inference derived by each of the one or more machine learning models and the one or more deep learning models; and
generating the recommendation using the ensembled inference based on the current context specific business goals and business optimization constraints.

17. The system of claim 16, wherein the one or more processors are further to dynamically update the feature dictionary with the current context associated with each of the real time features.

18. The system of claim 16, wherein the one or more processors are further to:
monitor performance indicators including (i) accuracy of the configurable recommendation model based on the set of real time features and values thereof, for building the one or more machine learning models and the one or more deep learning models (ii) business objective performance based on the set of real time features and values thereof, the business goals, business optimization constraints and actual conversion of the generated recommendation corresponding to each real time user action and (iii) performance of a business to consumer (B2C) system using the configurable recommendation model based on throughput and recommendation latency; and
initiate self-tuning by performing one or more of (i) regenerating the configurable recommendation model based on either regenerating or updating the set of features, (ii) updating the business optimization constraints and (iii) scaling out one or more nodes to improve throughput of the B2C system if the monitored performance indicators deviate from a pre-defined threshold.

19. A computer program product comprising a non-transitory computer readable medium having a computer readable program embodied therein, wherein the computer readable program, when executed on a computing device, causes the computing device to:
receive, via a batch interface, raw user data associated with a plurality of users from a plurality of sources;
merge the raw user data into a Common Data Format (CDF), wherein the CDF is a single file with records in the raw user data sorted on timestamp values associated thereof and viewed as a star schema of a fact table joined with dimension tables wherein the fact table pertains to user actions captured in the raw user data and the dimension tables are descriptive data of columns in the fact table; and generate a configurable recommendation model by:
processing the CDF to generate a set of features for building one or more machine learning models and one or more deep learning models, wherein the features comprise temporal features and non-temporal features;
creating a feature dictionary for the one or more machine learning models, wherein the feature dictionary is an in-memory persistent store configured to store the set of features and values associated thereof; and
ensembling the one or more machine learning models and the one or more deep learning models built using the generated set of features, to generate the configurable recommendation model.

20. The computer program product of claim 19, wherein the computer readable program further causes the computing device to perform one or more of:
generating the recommendation in response to the real time user action using the generated configurable recommendation model by:
receiving via a real time interface, the real time user action that needs to trigger the recommendation for a user;
retrieving a current context associated with the real time user action;
fetching real time features associated with the current context and corresponding to the one or more machine learning models and the one or more deep learning models;
generating the one hot vectors as the in-memory store, for the one or more machine learning models and an input vector for the one or more deep learning models based on the fetched real time features;
deriving an inference by each of the one or more machine learning models and the one or more deep learning models based on the generated one hot vectors and the input vector;
ensembling the inference derived by each of the one or more machine learning models and the one or more deep learning models; and
generating the recommendation using the ensembled inference based on the current context specific business goals and business optimization constraints;
dynamically update the feature dictionary with the current context associated with each of the real time features;
monitor performance indicators including (i) accuracy of the configurable recommendation model based on the set of real time features and values thereof, for building the one or more machine learning models and the one or more deep learning models (ii) business objective performance based on the set of real time features and values thereof, the business goals, business optimization constraints and actual conversion of the generated recommendation corresponding to each real time user action and (iii) performance of a business to consumer (B2C) system using the configurable recommendation model based on throughput and recommendation latency; and
initiate self-tuning by performing one or more of (i) regenerating the configurable recommendation model based on either regenerating or updating the set of features, (ii) updating the business optimization constraints and (iii) scaling out one or more nodes to improve throughput of the B2C system if the monitored performance indicators deviate from a pre-defined threshold.

* * * * *